US012748572B1

(12) United States Patent
Ellis et al.

(10) Patent No.: US 12,748,572 B1
(45) Date of Patent: Sep. 29, 2026

(54) SYSTEM AND METHOD FOR AUTOMATIC AND ADAPTIVE ASSOCIATION, TRACKING, LOADING AND UPDATING OF MACHINE INSTRUCTION CODE

(71) Applicant: Harmoni Solutions, Inc., Sterling, OH (US)

(72) Inventors: Adam Ellis, Sterling, OH (US); David Caputo, New York, NY (US); Andrew Smith, Hampton (CA)

(73) Assignee: Harmoni Solutions, Inc., Akron, OH (US)

( * ) Notice: Subject to any disclaimer, the term of this patent is extended or adjusted under 35 U.S.C. 154(b) by 258 days.

(21) Appl. No.: 18/402,651

(22) Filed: Jan. 2, 2024

Related U.S. Application Data

(60) Provisional application No. 63/477,928, filed on Dec. 30, 2022.

(51) Int. Cl.
*G06F 8/30* (2018.01)

(52) U.S. Cl.
CPC .................................. *G06F 8/30* (2013.01)

(58) Field of Classification Search
CPC .................................................. G06F 8/30
See application file for complete search history.

(56) References Cited

U.S. PATENT DOCUMENTS 10,318,403 B2 * 6/2019 Gao ...................... G06F 11/362
2003/0195670 A1 10/2003 Smith
2005/0153729 A1 7/2005 Logan
2006/0055552 A1 3/2006 Chung
2006/0168644 A1 7/2006 Richter
2007/0001854 A1 1/2007 Chung
2007/0174491 A1 7/2007 Still
2009/0009299 A1 1/2009 Ikeda
2012/0198413 A1 * 8/2012 Dang ........................ G06F 8/71
717/101
2013/0233922 A1 9/2013 Schoening
2014/0173439 A1 6/2014 Gutierrez
2015/0161424 A1 6/2015 Nevid
2016/0259636 A1 * 9/2016 Plate ....................... G06F 8/658
2016/0260166 A1 9/2016 Camillo
2017/0303187 A1 10/2017 Crouthamel
2018/0173910 A1 6/2018 Austin
2020/0143216 A1 5/2020 Sugar
2020/0201605 A1 * 6/2020 Tamagaki ............. G05B 19/05
2020/0277841 A1 9/2020 Olliff
2021/0397166 A1 * 12/2021 Sayyarrodsari ........... G06F 8/30
2022/0108448 A1 4/2022 Kono
2024/0090154 A1 * 3/2024 Harvey .................... H04B 3/46
2024/0403038 A1 * 12/2024 Ohba ........................ G06F 8/77

* cited by examiner

*Primary Examiner* — Wei Y Mui
*Assistant Examiner* — Travis Viet Tran
(74) *Attorney, Agent, or Firm* — Patent Law Works LLP

(57) ABSTRACT

The disclosure includes a system and method for automatic and adaptive association, tracking, loading and updating of machine instruction code. The method includes determining a tag proximate a machine; determining original machine instruction code to load on the machine based on the tag; loading the original machine instruction code on the machine; monitoring operation of the original machine instruction code on the machine; detecting a change in operation of the original machine instruction code on the machine; and automatically creating a modified machine instruction code based on the change in the original machine instruction code on the machine.

21 Claims, 19 Drawing Sheets

SYSTEM AND METHOD FOR AUTOMATIC AND ADAPTIVE ASSOCIATION, TRACKING, LOADING AND UPDATING OF MACHINE INSTRUCTION CODE

CROSS REFERENCE TO OTHER APPLICATIONS

This application also claims priority, under 35 U.S.C. § 119, of U.S. Provisional Patent Application No. 63/477,928, filed Dec. 30, 2022, and titled "Platform, Systems and Methods for Tracking, Measuring, Automating, and Optimizing the Operations of Employees and Equipment," which is incorporated by reference in its entirety.

BACKGROUND

1. Field of the Invention

The specification generally relates to operation and control of machines. In one aspect, the specification relates to a system and method for automatic and adaptive association, tracking, loading and updating of machine instruction code.

2. Description of the Background Art

There have been a number of attempts in the prior art to automate and optimize the operation of manufacturing facilities with computers and other technology. However, manufacturing facilities are a complicated environment in which machines, users or operators, tools, jobs, inventory items, and machine instruction code are required to be utilized correctly in order to produce the end product. Another issue is that often only select portions of the manufacturing facility are updated with new technologies, and the new technologies have difficulty communicating and interacting with each other, if at all.

One problem faced by many shops is caused by the use of one or more centralized, shared computers or devices where operators utilize time tracking systems to clock in/out for the day and charge time to the various jobs in production across the shop. This results in wasted time for operators as they traverse the shop floor to access the shared computers or devices, which can be quite far from the equipment that work is conducted on. Further, the manual entry of information by the operator at these shared computers includes the operator's identification, which job and operation the operator is working on, and which machine the work is being conducted on. This manual entry often leads to inaccurate or invalid data, which can lead to manufacturing errors, and can cause significant inefficiencies and waste of the user's time and utilization of the equipment.

Still another problem is that machines typically include computers and utilize machine instruction code to facilitate their operation. However, the machine instruction code that is required to run a job often needs to be updated, revised, or changed because a variety of different conditions and information. Operators are often left to determine which machine instruction code is required to run the job that they are tasked with, and there are often multiple versions and revisions of a particular piece of machine instruction code. Selecting the wrong machine instruction code to run can result in non-conforming product being produced, resulting in significant inefficiencies and waste of the user's time and utilization of the equipment.

SUMMARY

The techniques introduced herein overcome the deficiencies and limitations of the prior art, at least in part, with a system and method for automatically and adaptively tracking, associating, loading, and updating machine instruction code.

In one implementation, a computer-implemented method includes determining a tag proximate a machine; determining an original machine instruction code to load on the to the machine based on the tag, work to be performed; loading the original machine instruction code on the machine; monitoring the content of the original machine instruction code on the machine; detecting a change in the content of the original machine instruction code on the machine; and automatically creating modified machine instruction code based on the change to the content of the original machine instruction code that was loaded on the machine.

In general, another aspect of the subject matter described in this disclosure includes a system comprising one or more processors and memory operably coupled with the one or more processors, wherein the memory stores instructions that, in response to the execution of the instructions by one or more processors, cause the one or more processors to: determining a tag proximate a machine; determining an original machine instruction code to load on the machine based on the tag; loading the original machine instruction code on the machine; monitoring contents of the original machine instruction code on the machine; detecting a change in contents to the original machine instruction code on the machine; and automatically creating modified machine instruction code based on the change to the content of the original machine instruction code that was loaded on the machine.

Other aspects include corresponding methods, systems, apparatuses, and computer program products for these and other innovative aspects.

These and other implementations may each optionally include one or more of the following features. For instance, features may also include determining the tag or tags within range of the machine; determining a part based on the tag or tags; and identifying the original machine instruction code based on the part and the machine, or determining the tag or tags within range of the machine; determining a job identified by the tag or tags; determining a part associated with the job; and identifying the original machine instruction code based on the part and the machine. For example, in some implementations, the identifying the original machine instruction code includes searching a database of machine instruction code for machine instruction code that matches an identification number of the part; retrieving the machine instruction code that matches the identification number of the part; and using the retrieved machine instruction code as the original machine instruction code. For instance, the method further comprises storing the modified machine instruction code in a database of machine instruction code for machines. The method may further comprises creating a change document that includes a list of changes between the original machine instruction code and the modified machine instruction code; and storing the change document, the original machine instruction code and the modified machine instruction code in a database, and may further comprising generating and sending a change notification including the change document, the original machine instruction code and the modified machine instruction code to a formal notification system. For example, the method further includes copying the original machine instruction code to a memory device; connecting the memory device to the machine; and transferring the original machine instruction code from the memory device to the machine; or retrieving with a server the original machine instruction code for a database; sending the original machine instruction code from the server to a harmonization device; and installing the original machine instruction code on the machine using a machine instruction code loading module of the harmonization device. In another example, method includes determining whether a user has made any changes to the contents of the machine instruction code on the machine; identifying modifications to the original machine instruction code due to changes to the contents performed by a user of the machine; and wherein automatically creating the modified machine instruction code using the identified modifications. Another feature may be storing the original machine instruction code using an internal memory of a harmonization device, and emulating the original machine instruction code by a harmonization device as a USB device so the machine processes the emulated the original machine instruction code as being loaded to a USB port of the machine.

The features and advantages described herein are not all-inclusive and many additional features and advantages will be apparent to one of ordinary skill in the art in view of the figures and description. Moreover, it should be noted that the language used in the specification has been principally selected for readability and instructional purposes and not to limit the scope of the techniques described.

BRIEF DESCRIPTION OF THE DRAWINGS

The techniques introduced herein are illustrated by way of example, and not by way of limitation in the figures of the accompanying drawings in which like reference numerals are used to refer to similar elements.

DETAILED DESCRIPTION

Figure 1A:
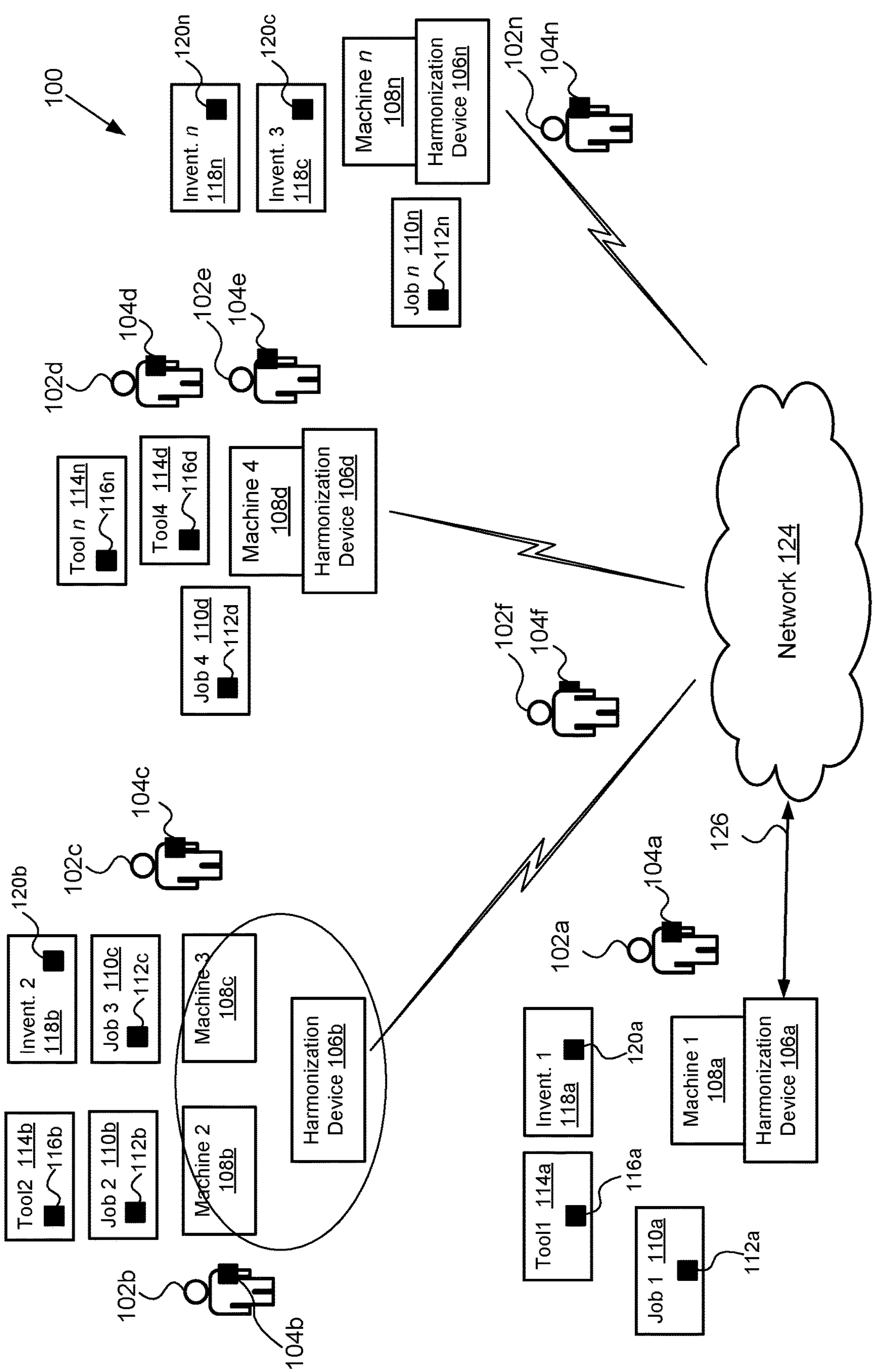
FIGS. 1A and 1B depict a high-level block diagram illustrating an implementation of a system for automatic and adaptive association and tracking of machines, employees, tools, jobs, and inventory items to optimize manufacturing operations in accordance with the present disclosure.
Figure 1B:
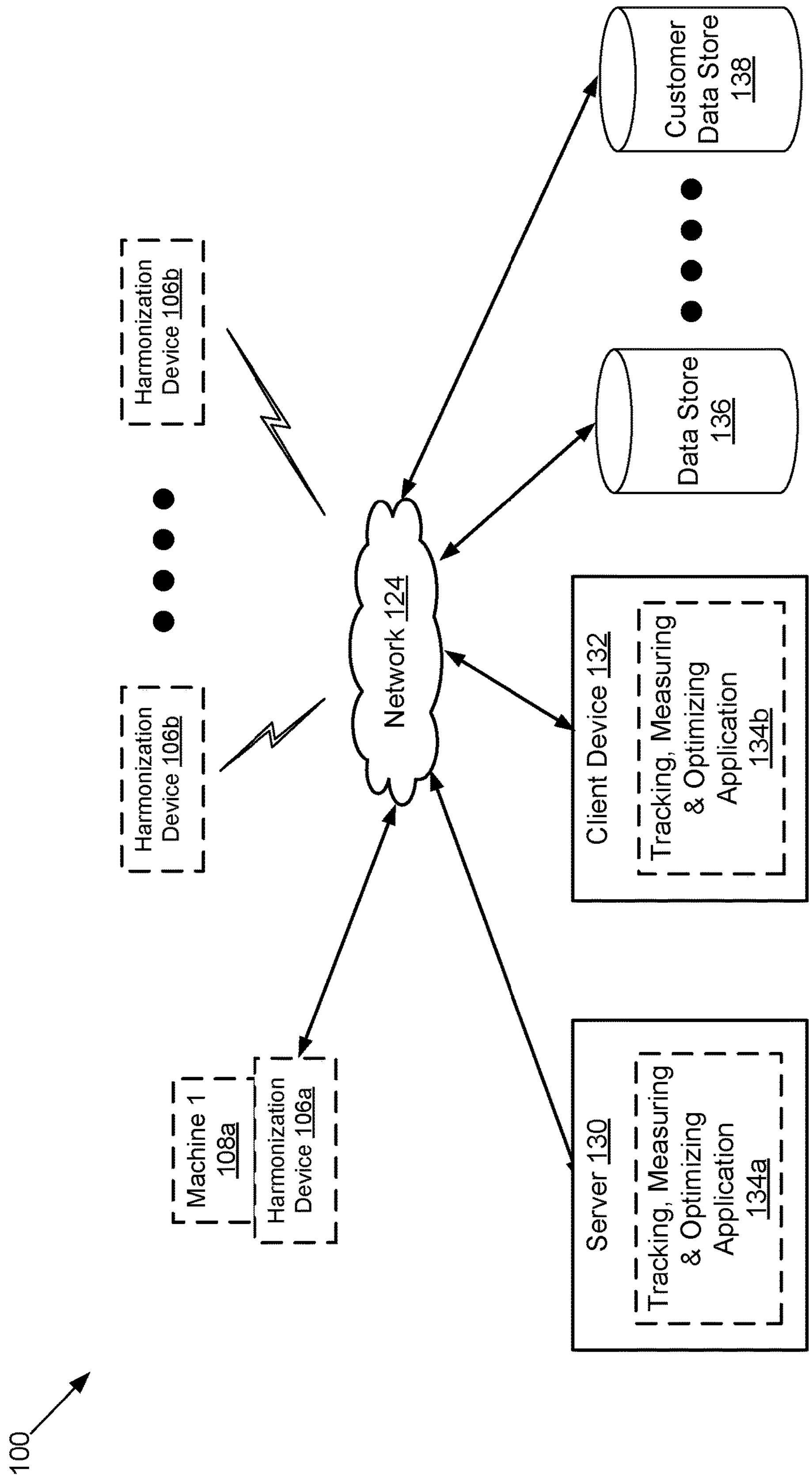

FIGS. 1A and 1B show an implementation of a system 100 for automatic and adaptive association and tracking of machines, employees, tools, jobs, and inventory items to optimize manufacturing operations in accordance with the present disclosure. The illustrated system 100 includes one or more harmonization devices 106*a*, 106*b*, 106*d*, and 106*n*, one or more machines 108*a*, 108*b*, 108*c*, 108*d*, 108*n*, a plurality of tags 104, 112, 116, and 120, a network 124, the server 130, a client device 132, and one or more data stores 136, 138. In the illustrated implementation, the entities of the system 100 are communicatively coupled via a network 124, and other physical couplings 126, 128 for cooperation and communication. Although only a single server 130, a two data stores 136, 138, and a single network 124 are shown in FIG. 1, it should be understood that there may be any number of servers 101 or a server cluster, any number of data stores 136, 138, and one or more networks 124 that connect these entities. In FIGS. 1A and 1B, and the remaining figures, a letter after a reference number, e.g., "106*a*," represents a reference to the element having that particular reference number. A reference number in the text without a following letter, e.g., "106," represents a general reference to instances of the element bearing that reference number.

FIG. 1A represents a front-end portion of the system 100. FIG. 1A illustrates an example manufacturing facility floor having various numbers of harmonization devices 106*a*, 106*b*, 106*d*, and 106*n*, machines 108*a*, 108*b*, 108*c*, 108*d*, 108*n*, and the network 124 positioned at various locations on the manufacturing facility floor. There are also one or more users or operators 102*a*, 102*b*, 102*c*, 102*d*, 102*e*, 102*f*, and 102*n*, one or more jobs 110*a*, 110*b*, 110*c*, 110*d*, and 110*n*, one or more tools 114*a*, 114*b*, 114*c*, 114*d*, 114*e*, one or more inventory items 118*a*, 118*b*, 118*c*, and 118*n*. These users 102, jobs 110, tools 114 and inventory items 118 move around the manufacturing facility floor to different positions in order to cooperate with the machines 108 and generate an end product. It should be understood that FIG. 1A is just one example of the possible positions for these items at a given point in time. FIG. 1A provides an illustrative example of different arrangements of users 102, jobs 110, tools 114, inventory items 118, machines 108 and harmonization devices 106 that may be possible on the manufacturing facility floor. Additionally, it should be understood that there are a variety of other arrangements beyond those disclosed in FIG. 1 that may be possible.

Additionally, FIG. 1A illustrates that the system 100 has use the plurality of the tags 104, 112, 116, and 120 to track items that may be moved across the manufacturing facility floor. Each tag 104, 112, 116, and 120 has a unique identifier that identifies the tag and is digitally readable. In some implementations, the tags 104, 112, 116, and 120 are grouped by the type of item they are associated with. For example, tags 104*a*, 104*b*, 104*c*, 104*d*, 104*e*, 104*f*, and 104*n* are each associated with a different user 102. Likewise, tags

112*a*, 112*b*, 112*c*, 112*d*, and 112*n* are associated with different jobs 110. Similarly, tags 116*a*, 116*b*, 116*c*, 116*d*, and 116*n* are associated with different tools 114. Finally, tags 120*a*, 120*b*, 120*c*, and 120 in our associated with a different inventory items 118. The tags 104, 112, 116, and 120 are each associated and physically connected to their respective item 102, 110, 114, and 118. The tags 104, 112, 116, and 120 may be self-contained (e.g., UHF RFID tags) or part of a host device (machine having a computer or an application running on a mobile device accessible via Wi-Fi or Bluetooth.)

FIG. 1B represents a backend portion of the system 100. In some implementations, the network 124 is a cloud and couples a backend portion of the system 100 to all the entities of the system on the manufacturing facility floor. As shown in FIG. 1B, the server 130, the client device 132, and the data stores 136 and 138 are physically coupled to the network 124. The server 130 and the client device 132 are illustrated as including the tracking, measuring and optimization application 134. For example, as depicted, the client device 132 may optionally (as indicated by the dashed lines) include an instance of the tracking, measuring, and optimizing application 134*b* and the server 122 may include an instance of the tracking, measuring, and optimizing application 134*a*. However, in some implementations, the components and functionality of the tracking, measuring, and optimizing application 134 may be entirely client-side (i.e., at 134*b*), entirely server side (i.e., at 134*a*), or divide among the client device 132 and server 130 (i.e., divided across 134*a* and 134*b*). For example, as described below, some implementations may use machine learning (e.g., one or more algorithms to train one or more models), and the training and validation of the model(s) may be performed server-side at 134*a* and applied, during production, client side at 134*b*. The structure and operation of the server 130 and the client 132 will be described in more detail below with reference to FIG. 3. Although FIG. 1B only illustrates data stores 136, 138, the system 100 may include any number of data stores. In this example, one data store 136 is used to store information about the organization and operation of the system 100. The second data store 138 is used to store customer information where the customer is the entity for which the system is manufacturing product. In some implementations, the data store 138 may store enterprise resource planning (ERP) information of the customer.

The one or more harmonization devices 106 are devices to coordinate, track and control the operation of the machines 108 on the manufacturing facility floor. The harmonization devices 106 are particularly advantageous because they are able to manage and track users 102, jobs 110, tools, 114 and inventory items 118. Moreover, the operation of the harmonization devices 106*a*, 106*b*, 106*d* and 106*n* may be coordinated by the tracking, measuring and optimization application 134. The harmonization devices 106 can also coordinate the operation of all the resources available on the manufacturing facility floor. The harmonization devices 106 perform a number of different functions which are described in more detail below with reference to FIG. 2. In some implementations, the harmonization device 106 is physically coupled for communication and physically attached to a corresponding machine 108. For example, harmonization device 106*a* is attached and coupled to machine 108*a*, harmonization device 106*d* is attached and coupled to machine 108*a*, and harmonization device 106*n* is coupled to machine 108*n*. In some instances, one harmonization device 106*b* may be associated and in communication with two or more machines 108*b* and 108*c*. In such an example, the harmonization device 106*b* is not attached to either machine 108*a* or 108*c* but is coupled for communication and interaction with both machines 108*a* and 108*c*. In some implementations, the harmonization device 106 is attached to the machine 108 in a position that is proximate the controls of the machine 108 so that the display and input to the harmonization device 106 is close to the controls and display of the machine 108. In some implementations, the harmonization device 106 is software that can be loaded onto the machine 108.

The one or more machines 108 are representative of any type of machine 108 that may be on a manufacturing facility floor. These machines 108 can be various types of precision machines for example, for cutting, drilling, turning, milling, grinding, welding, spraying, etc. In some implementations, each of these machines 108 can be computer controlled and monitored. For example, the machines 108 may have computer numerical control (CNC). CNC is a manufacturing method that automates the control, movement, and precision of machine through the use of a computer and preprogrammed computer software, which is embedded inside the machines 108. In some implementations, the machine 108 may be a workstation at which a user 102 performs an activity for a job 110. For example, the machine 108 may be an assembly station where a user 102 interacts with a part or performs some action on a part. Such workstations may be at any location on the manufacturing facility floor. The one or more machines 108 include an interface and are coupled for communication and control by a respective harmonization device 106. It should be understood that there may be a variety of different types of machines. For each machine type, there may be several machines 108 of that type with each machine uniquely identified. For example, there might be three drill presses of an identical type.

As shown in FIG. 1A, the network 124 wirelessly communicates with the harmonization devices 106*b*, 106*d* and 106*n*. In contrast, harmonization device 106*a* is physically coupled to the network 124 by ethernet, fiber-optic, coaxial cable copper wire or other wired connection.

The network 124 can be a conventional type, wired or wireless, and may have numerous different configurations including a star configuration, token ring configuration or other configurations. Furthermore, the network 124 may include a local area network (LAN), a wide area network (WAN) (e.g., the Internet), and/or other interconnected data paths across which multiple devices may communicate. In some implementations, the network 124 may be a peer-to-peer network. The network 124 may also be coupled to or include portions of a telecommunications network for sending data in a variety of different communication protocols. In some implementations, the network 124 may include Bluetooth communication networks or a cellular communications network (e.g., 4G or 5G) for sending and receiving data including via short messaging service (SMS), multimedia messaging service (MMS), hypertext transfer protocol (HTTP), direct data connection, WAP, email, etc. In some implementations, the network 124 is representative of the cloud. The network 124 may also include other interconnected data paths across which multiple devices may communicate.

The server 130 may be either a hardware server, a software server, or a combination of software and hardware. The server 130 may be, or may be implemented by, a computing device including a processor, a memory, applications, a database, and network communication capabilities. In some implementations, the server 130 receives and sends information, machine instruction code, and metadata to and from the harmonization devices 106. As shown, the server 130 includes the tracking, measuring and optimization application **134*a*. In some implementations, the server 130 sends and receives data to and from other entities of the system 100 via the network 124. For example, the server 130 receives and send machine instruction code and information from the client device 132 or the data 136, 138, receives user input regarding the operation of the machines 108, use of the tools 114, processing of the jobs 110, use of the inventory 118, and activities of the users 102**.

The client device 132 is a computing device including a processor, a memory, applications, a database, and network communication capabilities. For example, the client device 132 can be a laptop computer, a desktop computer, a tablet computer, a mobile telephone, a personal digital assistant (PDA), a mobile email device, a television with one or more processors embedded therein or coupled thereto or any other electronic device capable of accessing the network 124 and communicating with the sever 130, and the data store 136, 138. In some implementations, the client device 132 includes a capture device (not shown), and thus possesses the capability of navigating throughout its environment (e.g., walking through the manufacturing facility floor) and acquiring a series of time-related images of a video. For example, the client device 132 may be a smart phone with a camera. The client device 132 receives and sends data to and from a user accessing the client device 132. For example, the client device 132 presents a video to a user and receives user input regarding a portion of the video from the user. The client device 132 also communicates with the server 130, any harmonization devices 106, and the data store 136 via the network 124 for providing functionality described herein. In some implementations, the client device 132 further comprises a tracking, measuring and optimization application **134*b*** as will be described below.

The data store 136, 138 is a non-transitory memory that stores data for providing the functionality described herein. In the illustrated implementation, the data storage 136, 138 is communicatively coupled to the network 124. The data storage 136, 138 stores information that is used to provide functionality as described herein. For example, the data storage 136, 138 may store machine state, machine instruction code, machine instruction code revision history, quality information, an original video, images, tag information, tracking information, quality information, job information, machine learning models, training data, and mathematical representations of images or environment information contained therein, databases of device information, programs, network information user information, and various other information to representations related to operation and usage of users 102, machines 106, jobs 110, tools 114, and inventory items 118. For example, the database in data store 136, 138 (and 243) includes one or more databases that stores thousands of machine instruction code files. More specifically, machine instruction code is information that instructs the machine 108 how to operate. For example, the machine instruction code may be written in languages that are specific to the particular machine. The machine instruction code may also be stored as binary, text, or may consist of one or more files. In some implementations, the machine instruction code may include information specifying one or more configurations of the machine 108. In some instances, the machine instruction code may be stored in a compressed format. Additionally, the programs may be specific to any one of a specific machine 108, job 110, or inventory item 118 such as a part. In some instances, the machine instruction code may include metadata such as an associated part, assembly, operation, activity, job 110, tool 114, or machine 108. Administrators such as engineers, programmers, and other people in the engineering department can edit, manage, and upload machine instruction code via the network 124 which are stored in this database. There are revision controls applied to this machine instruction code, such that changes made to them via the server 130 or client 132 system are tracked (who made the change, and when) and version numbers are auto incremented. Also in the system 100, administrators can link this machine instruction code (a specific version) to a part number (which is also version controlled) so for example, part XYZ revision A would be linked to a machine instruction code named ABC revision D. The machine instruction code can even be specific to a machine type, i.e., part XYZ revision A might use different machine instruction code on resource X and resource Y—and database tracks that association. Machine instruction code can be specified right down to the operation level for a part, i.e., part XYZ revision A might have 10 operations that need to happen to complete it, and we can specify machine instruction code for each of those. Merely as an illustrative example, the machine instruction code where the machine 108 is a drill may specify what position the drill head should be at, what the offset from a part the drill head should be at, and what the position of the part should be at. One example of machine instruction code is for a particular, machine 108 to manufacture a specific part is:

```
G17 G20 G90 G94 G54
G0 Z0.25
X-0.5 Y0.
Z0.1
G01 Z0. F5.
G02 X0. Y0.5 I0.5 J0. F2.5
X0.5 Y0. I0. J-0.5
X0. Y-0.5 I-0.5 J0.
X-0.5 Y0. I0. J0.5
G01 Z0.1 F5.
G00 X0. Y0. Z0.25
```

Other variations and/or combinations are also possible and contemplated. It should be understood that the system 100 illustrated in FIG. 1 is representative of an example system 100 and that a variety of different system environments and configurations are contemplated and are within the scope of the present disclosure. For example, various acts and/or functionality may be moved from a server to a client, or vice versa, data may be consolidated into a single data store or further segmented into additional data stores, and some implementations may include additional or fewer computing devices, services, and/or networks, and may implement various functionality client or server-side. Furthermore, various entities of the system 100 may be integrated into a single computing device or system or divided into additional computing devices or systems, etc.

Referring back to FIG. 1A, the users 102, harmonization devices 106, machines 108, jobs 110 and tools 114 shown in various different configurations of movement that may be possible on the manufacturing facility floor.

A user or operator 102 includes any human or employee on the manufacturing facility floor but may also include robots or machines that operate machinery on the shop floor in a similar fashion. Each user 102 also has an assigned a unique identification tag 104 that can be used to identify them. In some implementation, the tags are included as part of the employee's badge or any other item that is carried by the employee or attached to them as they traverse the manufacturing facility floor. The user 102 may be a machine operator, a repair person, a supervisor, a floor manager, a maintenance person, or any other person, robot, or machine performing the function that the system 102 track.

A job or job traveler 110 is a description of a process for producing a product including all the machines, tools, parts, inventory items, quantity, processes, etc. and the order in which they need to be performed as well as the quantity which should be used to produce the product. In some implementations, the job or job traveler 110 is a printed document or other physical representation of the job. In some implementations, the job may be a work order. In some implementations, each job 110 is assigned a prioritization level that can be used for ranking the order in which jobs are completed. A first prioritization level. For example, certain work orders may have a first prioritization level and are ranked with the highest or more urgent prioritization. Other jobs 110 may have a second prioritization level with normal prioritization and be completed when resources are available. Still other jobs may have a third prioritization level that is a low prioritization and can be completed after jobs with a rush or normal prioritization are completed. According to the present disclosure, the job 110 has a tag attached to it to identify which job it is. In some implementations the job 110 is associated with other users 102, tools 114, and inventory 118 that can be at various locations on the manufacturing facility floor.

A tool 114 is a component used by a machine 108 or a component used by users 102 to perform job functions. For some examples, a particular tool 114 is only usable with a particular machine. In other examples, a particular tool 114 may be used with many different machines. Example tools 114 include drill bits, end mills, face mills, reamers, gear cutters, five cutters, thread mills, cutting tools, tools of different materials, gauges, hand tools, etc. The tools 114 in FIG. 1A can be any type of tool needed by any type of machine 108 or any type of component used by users to perform the job 110. Each of the tools 114 on the manufacturing facility floor has a unique identification tag 116 associated with it. In some implementations, the tag 116 is attached directly to the tool. In other implementations, the tag 116 is attached to the toolholder or cart. The tools 114 may be stored in the general area accessible by any user 102 or the tools 114 may be stored proximate a particular machine 108, and thus, in a range of being read by the harmonization device 106 associated with the machines 108.

An inventory item 118 is any part, component, or raw material processed by a machine 108. The inventory item 118 has an associated tag 120 associated with it that identifies the part itself or a type of part. For example, if the inventory item 118 is large enough, the tag 120 may be attached directly to the inventory item. In other cases, where the inventory item 118 may be several small parts and they are all in the same container or holder, the tag 120 is attached to the container or holder carrying small parts.

FIG. 1A also illustrates a number of examples of positioning configurations that may be common on the manufacturing facility floor.

In a first example, the close proximate position of harmonization device 106*a* attached to machine 108*a* and with user 102*a*, job 110*a*, tool 114*a*, inventory item 118*a* illustrates a typical configuration in which the machine 108*a* is in close proximity to all the resources needed to complete one step in a job 110*a* as the tool 114*a*, inventory item 118*a* are located close to machine 108*a* and can be detected by its associated harmonization device 106*a*.

In a second example, the position of machine 108*b* is in close proximity to the user 102*b*, job 110*b*, and tool 114*b* show an example where everything but the inventory item needed is near the machine 108*b* needed to complete a job 110*b*. The associated harmonization device 106*b* can detect this condition and take steps to move the inventory item necessary to complete the job 110*b* to machine 108*b*.

In a third example, the position of machine 108*c* is in close proximity to the user 102*c*, job 110*c*, and the inventory item 118*b* but the tool needed to complete the job 110*c* is not in the area. The associated harmonization device 106*b* can detect this condition and take steps to move the necessary tool to machine 108*c*.

In a fourth example, a machine 108*d* and associated harmonization device 106*d* are in close proximity with a job 110*d* and a pair of tools 114*d*, 114*n*, and a pair of users 102*d*, 102*e*. In this example, the harmonization device 106*d* can determine between multiple tools 114 and users 102 which are associated with the job 110*d* and how to prioritize a given job 110 amongst multiple tools 114*d*, 114*n*, and a pair of users 102*d*, 102*e*.

In a fifth example, a machine 108*n* and its associated harmonization device 106*n* are in close proximity with a job 110*n*, a user 102*n*, and plurality of inventory items 120*c*, 120*n*. In this example, the harmonization device 106*n* is able to determine if any tools are necessary and have them moved towards machine 108*n* and also prioritize which inventory item 118 should be used first between inventory item 118*c* and inventory items 118*n*.

In a final example, the user is randomly walking the manufacturing facility floor such as a supervisor or manager represented by user 102*f*. The user 102*f* is not near any machine move in the manufacturing facility floor to oversee another user 102 that is an operator.

Figure 2:
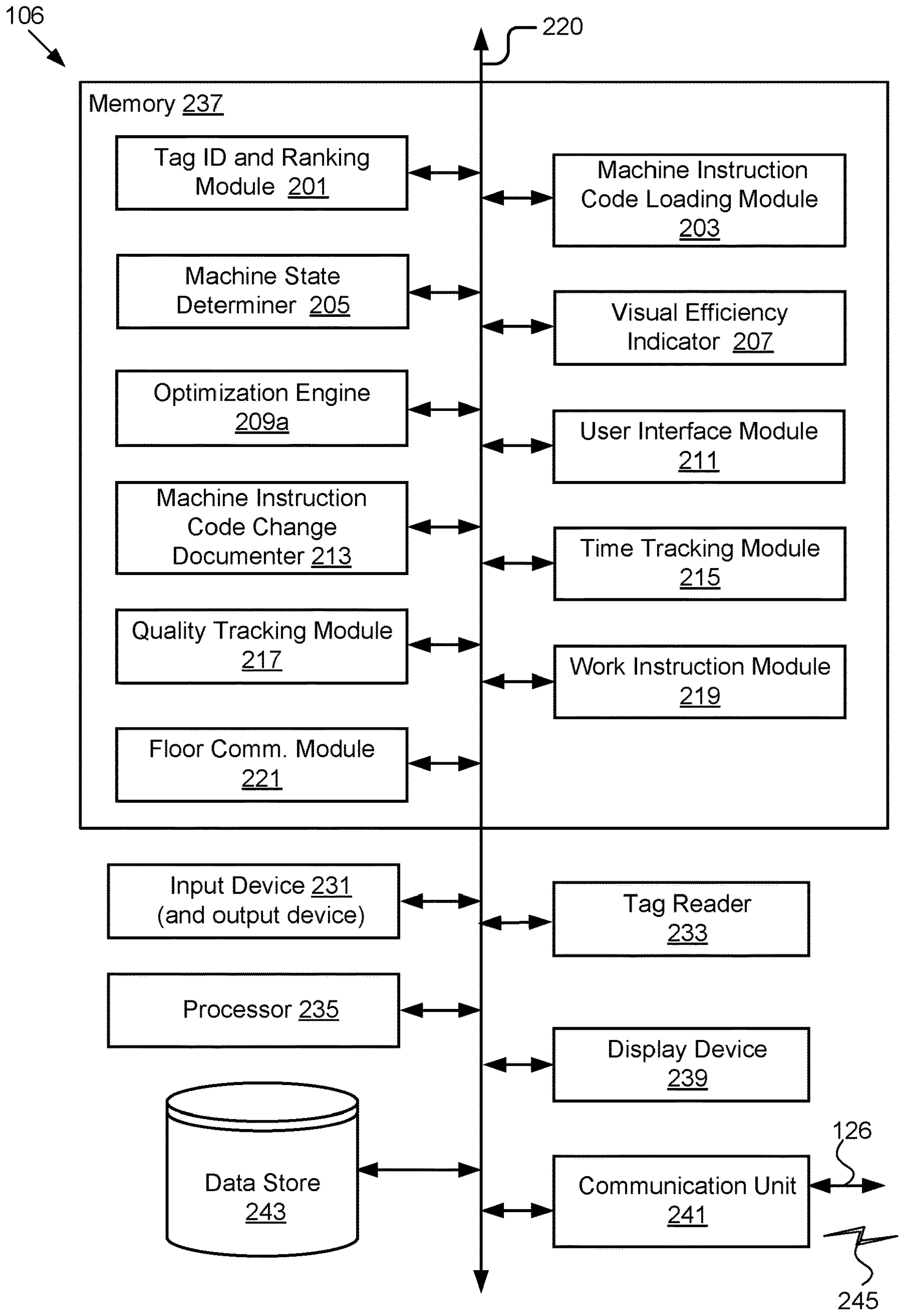
FIG. 2 depicts a block diagram illustrating an implementation of a harmonization device in accordance with the present disclosure.

FIG. 2 depicts an implementation of a harmonization device 106 in accordance with the present disclosure. The harmonization device 106 includes an input device 231, a tag reader 233, a processor 235, a memory 237, a display device 239, a communication unit 241, and a data store 243 according to some examples. The components of the harmonization device 106 are communicatively coupled to a bus or software communication mechanism 220 for communication with each other. The components of the harmonization device 106 may also communicate and interact with other components of the system 100 via the communication unit 241.

The input device 231 is any device for inputting information into the harmonization device 106. In some implementations, the input device 231 may include one or more peripheral devices. For example, the input device 231 may include a keyboard, a pointing device, microphone, an image/video capture device (e.g., camera), a touch-screen display integrated with an output device. The output device may be any device capable of outputting information from the harmonization device 106. The output device may include one or more of a display (LCD, OLED, etc.), a printer, a haptic device, audio reproduction device, touch-screen display, a remote computing device, etc. In some implementations, the output device is a display device 239 which may display electronic images and data output by a processor, such as processor 235 of the harmonization device 106 for presentation to a user. Examples of the display device 239 are described in more detail below.

The tag reader 233 is a device for reading tags. In some implementations, the tag reader 233 is a radio frequency identification (RFID) reader. The tag reader 233 is a radio frequency device that emits a signal through an antenna. This signal is received by RFID tags that respond to interrogation by the tag reader 233. An RFID tag is a wireless device for identifying unique items by use of radio waves.

An RFID tag is formed of a microchip that is attached to an antenna and upon which is stored a unique digital identification number. Responses from the tags are read by the tag reader 233, and through a variety of protocols the tag reader 233 can communicate with all the RFID tags in its field. The tag reader 233 outputs tag identification numbers that are within range of the tag reader and the signal strength of the tags that have been detected. For example, the tag reader 233 may have a read range from 6 inches to 30 feet. In some implementations, the tag reader 233 may use alternative technologies such as near field communication (NFC) or Bluetooth low energy (BLE).

The processor 235 may execute software instructions by performing various input/output, logical, and/or mathematical operations. The processor 235 may have various computing architectures to process data signals including, for example, a complex instruction set computer (CISC) architecture, a reduced instruction set computer (RISC) architecture, and/or an architecture implementing a combination of instruction sets. The processor 235 may be physical and/or virtual and may include a single processing unit or a plurality of processing units and/or cores. In some implementations, the processor 235 may be capable of generating and providing electronic display signals to the display device 239, supporting the display of user interfaces used in scheduling a consultation, and performing complex tasks including generating rules, identifying a recommended list of service providers, etc. In some implementations, the processor 235 may be coupled to the memory 237 via the bus 220 to access data and instructions therefrom and store data therein. The bus 220 may couple the processor 235 to the other components of the harmonization device 106 including, for example, the input device 231, the tag reader 233, the memory 237, the display device 239, the communication unit 241, and the data store 243. It should be understood that other processors, operating systems, and physical configurations are possible.

The memory 237 may store and provide access to data for the other components of the harmonization device 106. In some implementations, the memory 237 may store instructions and/or data that may be executed by the processor 235. The instructions and/or data may include code for performing the techniques described herein. For example, in one implementation, the memory 237 may store the components described above to implement the operations of the harmonization device 106 described in more detail below with reference to FIGS. 4, 6, 8, 10, 13, 14, and 15. The memory 237 is also capable of storing other instructions and data, including, for example, an operating system, hardware drivers, web browsers, other software applications, databases, etc. The memory 237 may be coupled to the bus 220 for communication with the processor 235 and the other components of the harmonization device 106.

The memory 237 may include one or more non-transitory computer-usable (e.g., readable, writeable) device, a dynamic random access memory (DRAM) device, a static random access memory (SRAM) device, an embedded memory device, a discrete memory device (e.g., a PROM, FPROM, ROM, Flash), a hard disk drive, an optical disk drive (CD, DVD, Blu-ray™, etc.) mediums, which can be any tangible apparatus or device that can contain, store, communicate, or transport instructions, data, computer programs, software, code, routines, etc., for processing by or in connection with the processor 235. In some implementations, the memory 237 may include one or more of volatile memory and non-volatile memory. It should be understood that the memory 237 may be a single device or may include multiple types of devices and configurations.

The display device 239 is a liquid crystal display (LCD), light emitting diode (LED) or any other similarly equipped display device, screen, or monitor. The display device 239 represents any device equipped to display user interfaces, electronic images and data as described herein. In different implementations, the display is binary (only two different values for pixels), monochrome (multiple shades of one color), or allows multiple colors and shades. The display device 239 is coupled to the bus 220 for communication with the processor 235 and the other components of the harmonization device 106. The display device 239 is used to display user interfaces, images, videos, video compositions, and other information to users 102 interacting with the harmonization device 106.

The communication unit 241 is hardware for receiving and transmitting data by linking the processor 235 to the network 124 and other processing systems. The communication unit 241 receives and sends data such as text, programs, images, video, and other data from sources external to the harmonization device 106. The communication unit 241 facilitates communication between the harmonization device 106 components and the attached machine 108, the network 124, the server 130, the client device 132, and other harmonization devices 106. The communication unit 241 is coupled to the bus 220. While the communication unit 241 is shown as having both a wired and wireless connection, it should be understood that only type of connection is necessary. In one implementation, the communication unit 241 may include a port for direct physical connection to the network 124, for example for harmonization device **106*a*. For example, it may be an ethernet port (e.g., RJ45) port or similar port (e.g., RJ 232) for wired communication with the network 102. In another implementation, the communication unit 241 may include a wireless transceiver (not shown) for exchanging data with the network 124 or any other communication channel using one or more wireless communication methods, such as IEEE 802.11, IEEE 802.16, Bluetooth®, cellular communications, or another suitable wireless communication method. For example, this wireless communication channel 245 is used to couple harmonization device 106*b*, 106*d* and 106*n* to the network 124**.

The data store 243 is a non-transitory memory that stores data for providing the functionality described herein. In the illustrated implementation, the data store 243 is communicatively coupled to the bus 220. The data store 243 stores information that is used to provide functionality as described herein. For example, the data store 243 may store data, machine instruction code, historical information, and other information until the harmonization device 106 is able to send it to the machine 108, the server 130, the client device 132 or another data store 136, 138 on the cloud. The data stored in the data store 243 is described below in more detail.

It should be understood that other processors, operating systems, input devices (e.g., keyboard, mouse, one or more sensors, etc.), output devices (e.g., a speaker, display, haptic motor, etc.), and physical configurations are possible and within the scope of the disclosure. Examples of sensors (not shown) include, but are not limited to, a microphone, a speaker, a camera, a thermal camera, a pointer sensor (e.g., a capacitive touchscreen or mouse), a gyroscope, an accelerometer, a galvanic sensor, thermocouple, heart rate monitor, breathing monitor, electroencephalogram (EEG), iris scanner, fingerprint reader, raster scanner, palm print reader, an inertial sensor, global positioning system (GPS) sensor, etc.

As also shown in FIG. 2, the memory 237 includes a tag identification and ranking module 201, a machine instruction code loading module 203, a machine state determiner 205, a visual efficiency indicator 207, and optimization engine 209*a*, a user interface module 211, a machine instruction code change documenter 213, the time tracking module 215, quality tracking module 217, a work instruction module 219, and a floor communications module 221.

The components of the memory 237 are communicatively coupled to a bus or software communication mechanism 220 for communication with each other, and the other components of the harmonization device 106. The components of the memory 237 may include software and/or logic to provide the functionality they perform. In some implementations, the components can be implemented using programmable or specialized hardware including a field-programmable gate array (FPGA) or an application-specific integrated circuit (ASIC). In some implementations, the components can be implemented using a combination of hardware and software executable by processor 235. In some implementations, the components are instructions executable by the processor 235. In some implementations, the components are stored in the memory 237 as depicted and are accessible and executable by the processor 235.

The tag identification and ranking module 201 may be steps, processes, functionalities, software executable by a processor, or a device including routines to detect tags 104, 112, 116 and 120 within a readable range of the harmonization device 106 and determine the identity associated with the tag 104, 112, 116 and 120 and create a prioritization list for the tags proximate the harmonization device 106. The tag identification and ranking module 201 performs additional operations and functions as are described in more detail below with reference to FIG. 4. The tag identification and ranking module 201 is coupled to the tag reader 233 to receive information about tags 104, 112, 116 and 120 detected by the tag reader 233. The tag identification and ranking module 201 is also coupled to the communication unit 241 to receive and send information from the tracking, measuring and optimization application 134.

The machine instruction code loading module 203 may be steps, processes, functionalities, software executable by a processor, or a device including routines to communicate with and upload machine instruction code to the machine 108 associated with the harmonization device 106. The machine instruction code loading module 203 is also coupled by the communication unit 241 to the tracking, measuring, and optimizing application 134 to receive machine instruction code, configuration information and other data to load onto the machine 108. In some implementations, when a user 102 starts an operation on a machine 108 via a harmonization device 106, that harmonization device 106 checks with the tracking, measuring, and optimizing application 134 for any machine instruction code that might be associated with that part/operation detected by the tag identification and ranking module 201. If there is associated machine instruction code, the tracking, measuring, and optimizing application 134 pulls the correct revision of the machine instruction code from a databased and sends from the correct revision of the machine instruction code to the machine instruction code loading module 203, and the machine instruction code loading module 203 loads it onto the machine 108 via one of many methods. The machine instruction code loading module 203 may load the correct revision of machine instruction code wireless or by wired communication via Ethernet, RS232, or direct USB communication. In the case of direct USB communication, the harmonization device 106 may either load programs onto a portable USB device, or alternatively may emulate a traditional portable USB device, using its internal memory as the storage medium. When activated, the machine 108 will believe that a portable USB device has been inserted into it, but in fact the harmonization device 106 is emulating the USB device, having loaded the correct machine instruction code onto it via the machine instruction code loading module 203.

In some implementations, the machine instruction code loading module 203 can also communicate and send information received from machine 108 back to the tracking, measuring, and optimizing application 134.

The machine state determiner 205 may be steps, processes, functionalities, software executable by a processor, or a device including routines to determine the operational state of the machine 108 associated with the harmonization device 106. For example, the machine state determiner 205 may determine the machine's condition, generate notifications of changes in machine state, and record configurations and changes in machine state. The machine state determiner 205 performs additional operations and functions that are described in more detail below with reference to FIG. 6. The machine state determiner 205 is coupled for communication and cooperation with the machine 108 by the communication unit 241. The machine state determiner 205 is also coupled for communication and cooperation with the machine state monitor 303 of the tracking, measuring, and optimizing application 134 by the communication unit 241.

The visual efficiency indicator 207 may be steps, processes, functionalities, software executable by a processor, or a device including routines to determine the efficiency of the operation of the machine 108 associated with the harmonization device 106 and generate output information for presentation to the user 102. In some implementations, the visual efficiency indicator 207 determines the efficiency of the overall operation of the manufacturing facility and other users 102, tools 114, jobs 110 that are detected near the harmonization device 106. This information can be transmitted from the efficiency determination module 305 of the tracking, measuring and optimization application 134 or presented by the visual efficiency indicator 207 and the harmonization device 106 or the machine 108. In some implementations, the visual efficiency indicator 207 may also collect machine and operational data and concisely presented to the user 102 on the display device 239. Other administrators (managers, supervisors, engineers, etc.) can display the machine and operational data on the display of the server 130 or the client device 132 in a main dashboard to see aggregate data for all the machines. This allows them to drill in and see potential areas of improvement. In other implementations, a different version of the dashboard can be presented on a central screen (not shown) on the manufacturing facility floor, in the lobby, etc. Regardless of which interface or display mechanism is used, the visual efficiency indicator 207 can provide data in real-time and identify the best and worst points of performance.

The visual efficiency indicator 207 performs additional operations and functions as are described in more detail below with reference to FIG. 8. The visual efficiency indicator 207 is coupled to output efficiency information to the display device 239 of the harmonization device 106 and/or send it to the machine 108 for presentation. The visual efficiency indicator 207 is also coupled to receive and send information from the efficiency determination module 305.

The optimization engine 209*a* may be steps, processes, functionalities, software executable by a processor, or a device including routines to optimize the use and operation of the machine 108 associated with the harmonization device 106. In some implementations, the functions of the optimization engine 209*a* are performed by the optimization engine 209*b* of the tracking, measuring, and optimizing application 134. In other implementations, that functionality that will be described below is operational only on the optimization engine 209*a* of the harmonization device 106. In yet other implementations, the optimization operations are divided with some being performed on the optimization engine 209*a* and on the harmonization device and others being performed the optimization engine 209*b* on the server device 130 or client device 132. The optimization engine 209 is coupled to the other components of the harmonization engine 106 to determine the operational state of the associated machine 108 and determines and measures productivity and efficiency of the use of the machine 108. For example, the optimization engine 209 may receive information from the time tracking module 215 and the quality tracking module 217 as well as determine users 102, jobs 110, tools, 114, and inventory 118 that are approximate the machine 108. Using that information, the optimization engine 209 can determine how to prioritize jobs 110, how and which users 102 should perform what operations, what machines 108 may be used, and any other recommendations that may be provided to increase the productivity and operation of a given machine 108 or the entire manufacturing facility floor (e.g., coordination and recommendations for several jobs 110, users 102, tools 114, and machines 108.). The optimization engine 209*a* is coupled to the other components of the harmonization device 106. The optimization engine 209*a* is also coupled with the communication unit 241 for communication and cooperation with the tracking, measuring and optimization application 134.

The user interface module 211 may be steps, processes, functionalities, software executable by a processor, or a device including routines to present information to the user 102 and receive information from the user 102. The user interface module 211 is coupled to receive information from the input device 231 and from the communication unit 241. The user interface module 231 is also coupled to output information to the display device 239 (and other devices—not shown). In some implementations, the user interface module 211 also interacts with the machine 108 to send information for presentation by the machine 108 or to receive information from the machine 108. The user interface module 211 is coupled by the bus 220 to the other components 201, 203, 205, 207, 209*a*, 213, 215, 217, 219, and 221 of the harmonization device 106. The user interface module 211 is also coupled to the input device 231, the display device 239, and the communication unit 241.

The machine instruction code change documenter 213 may be steps, processes, functionalities, software executable by a processor, or a device including routines to record machine instruction code changes made on the machine 108 associated with the harmonization device 106. In some implementations, the machine instruction code change documenter 213 records any machine instruction code changes made by the user 102 on the machine 108. The user 102 may make changes to the machine instruction code directly when using the machine 108 or via the harmonization device 106. The machine instruction code change documenter 213 performs additional operations and functions as are described in more detail below with reference to FIG. 10 to detect changes made by the user 102, generates a change request and sends it for verification. If changes are detected, the machine instruction code change documenter 213 prompts the user 102 to send a "change request" to the engineering group, which documents exactly what the user 102 changed, who changed it, when it was changed, what part was running when the change was made, what machine instruction code, etc. Then the tracking, measuring, and optimizing application 134 allows for automatic integration of that change, at the discretion of the engineer reviewing the change, such that it is incorporated in a master document and shows up the next time any user 102 loads the machine instruction code. The machine instruction code change documenter 213 is coupled to the data store 243 and stores the change information in the data store. In some implementations, the machine instruction code change documenter 213 provides the change information to the communication unit 241 for transfer to other data stores 136, 138 or to the data store 243 of the server 130. The machine instruction code change documenter 213 is coupled by the bus 220 to the data store 243 and the communication unit 241 for sending change information to other devices for storage.

The time tracking module 215 may be steps, processes, functionalities, software executable by a processor, or a device including routines to record operation time of the machine 108 associated with the harmonization device 106. The time tracking module 215 also records the jobs 110, tools 114, users 102 that are near the machine 108 or entered via input device 231 during these operation times. The time tracking module 215 is coupled to the tag reader 233 and the machine state determiner 205 to receive this information and records it in the data store 243. In some implementations, the tracking module 215 also sends the operation time and the jobs 110, tools 114, users 102 that are near the machine 108 or entered via input device 231 to the tracking, measuring and optimization application 134. The time tracking module 215 is coupled to the other components of the harmonization device 106 by bus 220 for receiving and sending this information. The time tracking module is also coupled to the communication unit 241 to send this information to devices outside the harmonization device 106.

The quality tracking module 217 may be steps, processes, functionalities, software executable by a processor, or a device including routines to track and record the quality of operation of the machine 108. In some implementations, the quality tracking module 217 also records the jobs 110, tools 114, users 102 that are near the machine 108 or entered via input device 231 when these quality measurements are determined. In some implementations, the quality measurements are quality feature measures that are output by the machine 108. In some implementations, the quality measurements are quality feature measures that are measured using tools 114 that transmit data to the input device 231. In some implementations, the quality measurements are quality feature measures that are input by users 102 into input device 231. In some implementations, the quality tracking module 217 also processes the machine state as well as these quality measures and recommends or suggests machine setting changes based on the machine state. The quality tracking module 217 stores this quality information in the data store 243 or transmits/transfers it to devices outside the harmonization device 106 using the communication unit 241. The quality tracking module 217 is coupled by the bus 220 to the other components of the harmonization device 106 and other devices outside the harmonization device 106.

The work instruction module 219 may be steps, processes, functionalities, software executable by a processor, or a device including routines to show documentation related to a given job 110. For example, the work instruction module 219 shows revision-controlled drawings and/or other documents for jobs. The work instruction module 219 cooperates with the data store 243 or the tracking, measuring and optimization application 134 to retrieve documentation associated with a given job 110 that is in operation. As noted above, the particular job 110 in operation can be determined by the work instruction module 219 based on information it receives from the tag reader 233. Based on the information from the tag reader 233, the work instruction module 219 can retrieve the revision-controlled drawings and/or other documents for the job 110 from the data store 243 or other resource external to the harmonization device 106. In some implementations, the work instruction module 219 may determine the appropriate revision-controlled drawings and/or other documents based on job 110, machine 108, user 102, tool 114, or any combination thereof. The work instruction module 219 then cooperates with the user interface module 211 to present the revision-controlled drawings and/or other documents on the display device 239. The work instruction module 219 is coupled by the bus 220 to the other components of the harmonization device 106 and the other devices outside the harmonization device 106.

The floor communications module 221 may be steps, processes, functionalities, software executable by a processor, or a device including routines to allows users or operators 102 to send and receive communications from a variety of sources external to the harmonization machine 106 via network 124. For example, the floor communications module 221 allows operators to send and receive communications that include video calls, emails, text messages. The floor communications module 221 is coupled to the input device 231, the display device 239, the communications unit 241 and the processor 235 to perform this communication with a user 102 proximate the harmonization device 106. The floor communications module 221 is coupled by the bus 220 to the other components of the harmonization device 106 and the other devices outside the harmonization device 106.

Figure 3:
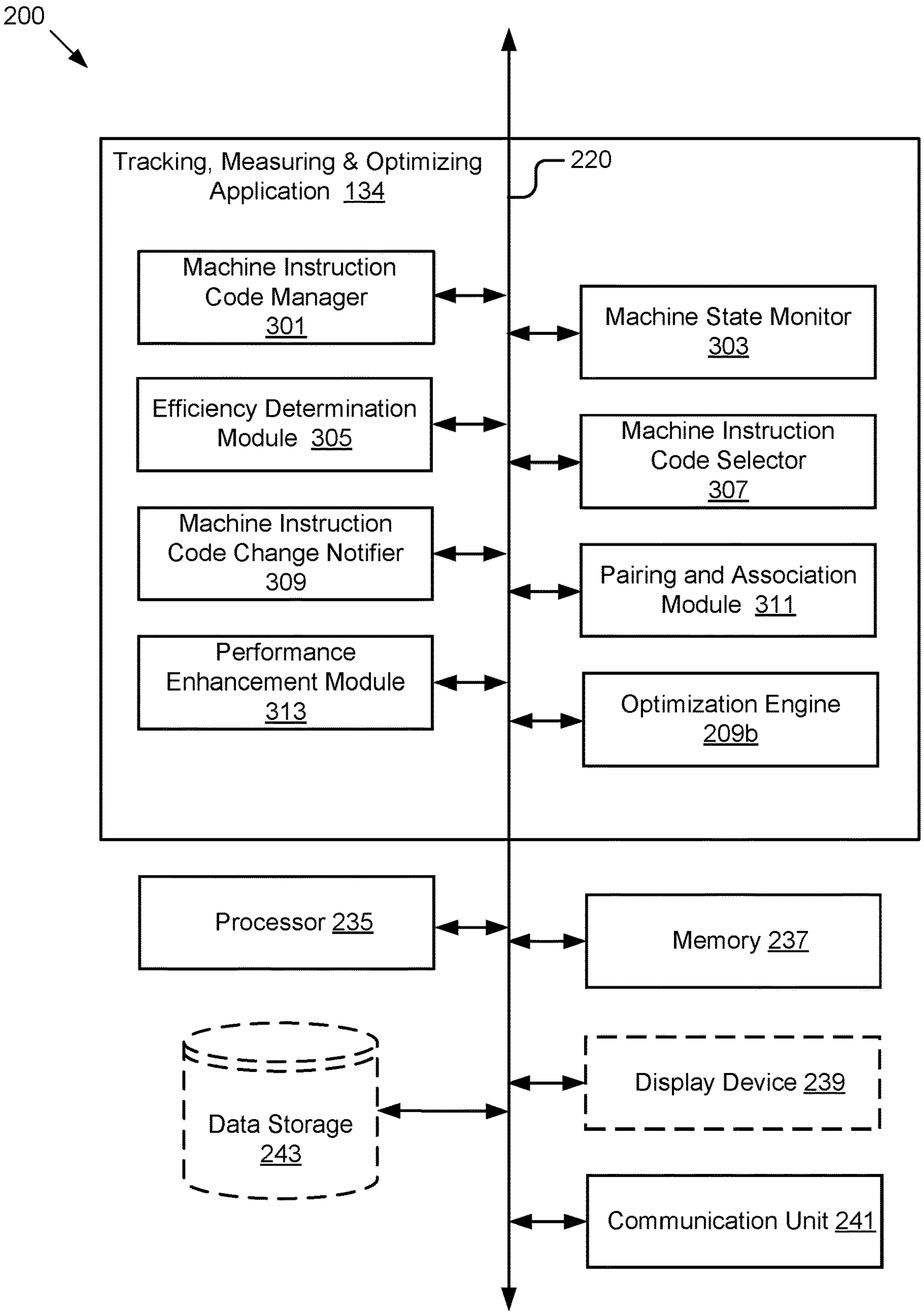
FIG. 3 depicts a block diagram illustrating an implementation of a computing device including a tracking, measuring & optimizing application.

FIG. 3 shows an implementation of a computing device 200 including an instance of the tracking, measuring & optimizing application 134. The tracking, measuring & optimizing application 134 which may refer to either instance 134*a* when the computing device 200 is the server 130, or instance 134*b* where the computing device 200 is a client device 132, or a combination of 134*a* and 134*b* where the functionality is divided between 134*a* of the server 130 and 134*b* of the client device 132. The computing device 200 may also include a processor 235, a memory 237, an optional display device 239, a communication unit 241, data store 243 and a bus 220 according to some examples. In this implementation of the computing device 200, like components with the same or similar functionality as that described above with reference to FIG. 2 have the same reference number. Since that functionality has been described above with reference to the description in FIG. 2 above, that description will not be repeated here.

As shown in FIG. 3, the tracking, measuring, and optimizing application 134 includes a machine instruction code manager 301, a machine state monitor 303, and efficiency determination module 305, a machine instruction code selector 307, a machine instruction code change notifier 309, a pairing and association module 311, a performance enhancement module 313, and an optimization engine 209*b*.

The components of the tracking, measuring, and optimizing application 134 are communicatively coupled to the bus 220 or software communication mechanism 220 for communication with each other, and the other components of the system 100. The components of the tracking, measuring, and optimizing application 134 may include software and/or logic to provide the functionality they perform. In some implementations, the components can be implemented using programmable or specialized hardware including a field-programmable gate array (FPGA) or an application-specific integrated circuit (ASIC). In some implementations, the components can be implemented using a combination of hardware and software executable by processor 235. In some implementations, the components are instructions executable by the processor 235. In some implementations, the components are stored in the memory as depicted and are accessible and executable by the processor 235.

The machine instruction code manager 301 may be steps, processes, functionalities, software executable by a processor, or a device including routines to determine the appropriate machine instruction code to be installed on a particular machine 108. In some implementations, machine instruction code manager 301 may associates machine instruction code to jobs 110 via advantageously removing the human element where operators manually pick which machine instruction code to run on machines 108, tracking changes to machine instruction code and managing approval cycles for modified machine instruction code, and automatically loading machine instruction code on to machines 108 in new ways including the detection of the tag associated with the job. The machine instruction code manager 301 tracks the revision history of machine instruction code, determines different versions of the machine instruction code to install on the machine, retrieves machine instruction code from storage and send the machine instruction code to the machine instruction code loading module 203 of the harmonization device for installation on the machine 108. The machine instruction code manager 301 cooperates with the machine instruction code installer 203 of the harmonization device 106 to install new/revised programs on the machine 108. The machine instruction code manager 301 performs additional operations and functions as are described in more detail below with reference to FIG. 5. The machine instruction code manager 301 is coupled to the harmonization devices 106*a*-106*n* to retrieve information about job 110 and machine 108 status and send new machine instruction code for installation. The machine instruction code manager 301 is also coupled to the other components of the server 130, in particular the data store 243 or other data stores 136, 138 to retrieve different machine instruction code versions for installation on the machine 108.

The machine state monitor 303 may be steps, processes, functionalities, software executable by a processor, or a device including routines to monitor the state of the machines 108*a*-108*n*. The machine state monitor 303 communicates with the machine state determiner 205 of each machine 108*a*-108*n* to determine the respective state of that machine 108. The machine state monitor 303 also retrieves the past states of a machine 108, determines changes in state, records changes in state and provides machine state information of other modules of the tracking, measuring and optimization application 134. The machine state monitor 303 performs additional operations and functions as are described in more detail below with reference to FIG. 7. The machine state monitor 303 is coupled to the harmonization devices 106*a*-106*n* to access their respective machine state determiners 205. The machine state monitor 303 is also coupled for communication and cooperation with the other elements of the tracking, measuring and optimization application 134.

The efficiency determination module 305 may be steps, processes, functionalities, software executable by a processor, or a device including routines to determine the efficiency of users 102, jobs 110, tools, 114, and machines 108. In some implementations, the efficiency determination module 305 determines the efficiency of users 102, jobs 110, tools, 114, and machines 108 individually. In some implementations, the efficiency determination module 305 can also determine efficiency of groups of users 102, jobs 110, tools, 114, and machines 108 in any variety of combinations. For example, the efficiency determination module 305 may determine that a particular user is particularly efficient at one type of job, while inefficient for other types of jobs. This may be determined on any number of variety of factors including machine type, job type, tools required, attributes of machines, etc. The efficiency determination module 305 may be coupled to the performance enhancement module 313 or the optimization engine 209*b* to provide efficiency information. The efficiency determination module 305 may also be coupled to the visual efficiency indicator 207 of the harmonization device 106*a*-106*n* so that efficiency information may be displayed to the user 102. The efficiency determination module 305 is coupled for communication and cooperation with the other elements of the tracking, measuring and optimization application 134, and the harmonization devices 106*a*-106*n*.

The machine instruction code selector 307 may be steps, processes, functionalities, software executable by a processor, or a device including routines to determine the machine instruction code for installation on the machine 108. In some implementations, the machine instruction code selector 307 determines the machine 108, job 110, tools 114, and determines the machine instruction code for use on the machine 108 that will be most efficient in completing the job 110. Once the machine instruction code has been selected, the machine instruction code selector 307 sends the machine instruction code to the machine instruction code loading module 203 of the harmonization device 106 for installation on the machine 108. The machine instruction code selector 307 performs additional operations and functions as are described in more detail below with reference to FIG. 9. The machine instruction code selector 307 is coupled to the data store 243 or other data stores 136, 138 to retrieve the appropriate machine instruction code and version. The machine instruction code selector 307 is coupled to send the machine instruction code to the harmonization device 106. The machine instruction code selector 307 is coupled for communication and cooperation with the other elements of the tracking, measuring and optimization application and the harmonization devices 106*a*-106*n*.

The machine instruction code change notifier 309 may be steps, processes, functionalities, software executable by a processor, or a device including routines to track which machine instruction code files are installed in which machines 108 at what times and store the record of any machine instruction code changes in a database in data store 243. In some implementations, the machine instruction code change notifier 309 cooperates with the machine instruction code loading module 203 and the machine instruction code change documenter 213 of each harmonization device 106*a*-106*n* to collect information as to the machine instruction code currently installed on machines 108*a*-108*n*. In some instances, this tracking is done in real-time. The machine instruction code change notifier 309 takes the collected information and stores it in the database in data store 243. In some implementations, the machine instruction code change notifier 307 also send notifications to the user interface 211 of the harmonization device 106 to present information to the user 102 as to what the prior machine instruction code installed contents were, the current machine instruction code contents, and what the next machine instruction code to be installed on machine 108 will be. The machine instruction code change notifier 309 is coupled for communication and cooperation with the other elements of the tracking, measuring and optimization application and the harmonization devices 106*a*-106*n*.

The pairing and association module 311 may be steps, processes, functionalities, software executable by a processor, or a device including routines to determine pairings and associations between a machine 108, a harmonization device 106 and one or more users 102, jobs 110, tools 114, and inventory items 118. As described above, users 102, jobs 110, tools 114, and inventory items may be moved about the manufacturing facility floor and be associated with different harmonization devices 106 and respected machines 108 at different times. The pairing and association module 311 determines which users 102, jobs 110, tools 114 and inventory items 118 are associated with the given machine 108 and harmonization device 103. The pairing and association module 311 receives tag identification numbers from the tag identification and ranking module 201 of a given harmonization device 106, retrieved and determines the information associated with those tags an and compares and associates a set of a user 102, a job 110, and an inventory item 118 with the machine 108. If needed, the tool 114 may also be associated in the set. The pairing and association module 311 operates in real-time and coordinates all the associated information of pairing between machines 108, and various set of users 102, jobs 110, tools 114, and inventory items 118 that are on the manufacturing facility floor. The pairing and association module 311 performs additional operations and functions as are described in more detail below with reference to FIG. 11. The pairing and association module 311 is coupled for communication and cooperation with the other elements of the tracking, measuring and optimization application and the harmonization devices 106*a*-106*n*.

The performance enhancement module 313 may be steps, processes, functionalities, software executable by a processor, or a device including routines to improve the performance of an individual machine 108 or the overall performance of the manufacturing facility (e.g., some collection a subset of users 102, machines 108, and jobs 110). The performance enhancement module 311 may also improve the performance of the individual users 102, or performance of a job 110. In some implementations, performance enhancement module 313 performs additional operations and functions as are described below with reference to FIG. 12. The performance enhancement module 313 cooperates with the harmonization devices 106 to collect information related to users 102, machines 108, jobs 110, tools 114, and inventory items 118. The performance enhancement module 313 performs artificial intelligence or machine learning analysis on the collected data and generates recommendations. The operation of the performance enhancement module 313 as well as other operations of performs are described in more detail below with reference to FIG. 12. The performance enhancement module 313 is coupled for communication and cooperation with the other elements of the tracking, measuring and optimization application and the harmonization devices 106*a*-106*n*.

The optimization engine 209*b* may be steps, processes, functionalities, software executable by a processor, or a device including routines to coordinate the operation of the users 102, harmonization devices 106, machines 108, jobs 110 and tools 114. While the optimization engine 209*a* described above was primarily focused on optimization of the operation of a single machine 108 and associated harmonization device 106, it should be understood that rather than being on the harmonization device 106, that optimization may occur on the server 130 within optimization engine 209*b*. Additionally, the optimization engine 209*b* may coordinate the operation to maximize the production to be and use of the plurality of machines 108*a*-108*n* on the manufacturing facility floor. It should be understood that the optimization of the operation of the manufacturing facility floor is different from the optimization of the operation of an individual machine 108. For example, the optimization engine 209*b* may determine particular order of processing by particular machines 108*a*-108*n* for a given job to be processed by different machines 108*a*-108*n* on the manufacturing facility floor. Similarly, the optimization engine 209*b* may also coordinate particular users 102*a*-102*n* that are particularly efficient at using a particular type of machine 108 and assign those users 102*a*-102*n* to perform a portion of a job 110 associated with the particular machine 108. In some implementations, the optimization engine 209*b* determines in real-time the users 102, machines 108, tools 114, and inventory items 118 currently available and their locations on the manufacturing facility floor and assigns them to different machines 108 for completion of the job 110 in the most efficient manner. The optimization engine 209*b* utilizes a variety of factors in making this determination as will be described below with reference to FIG. 4-12. The optimization engine 209*b* is coupled for communication and cooperation with the other elements of the tracking, measuring and optimization application and the harmonization devices 106*a*-106*n*.

Figure 4:
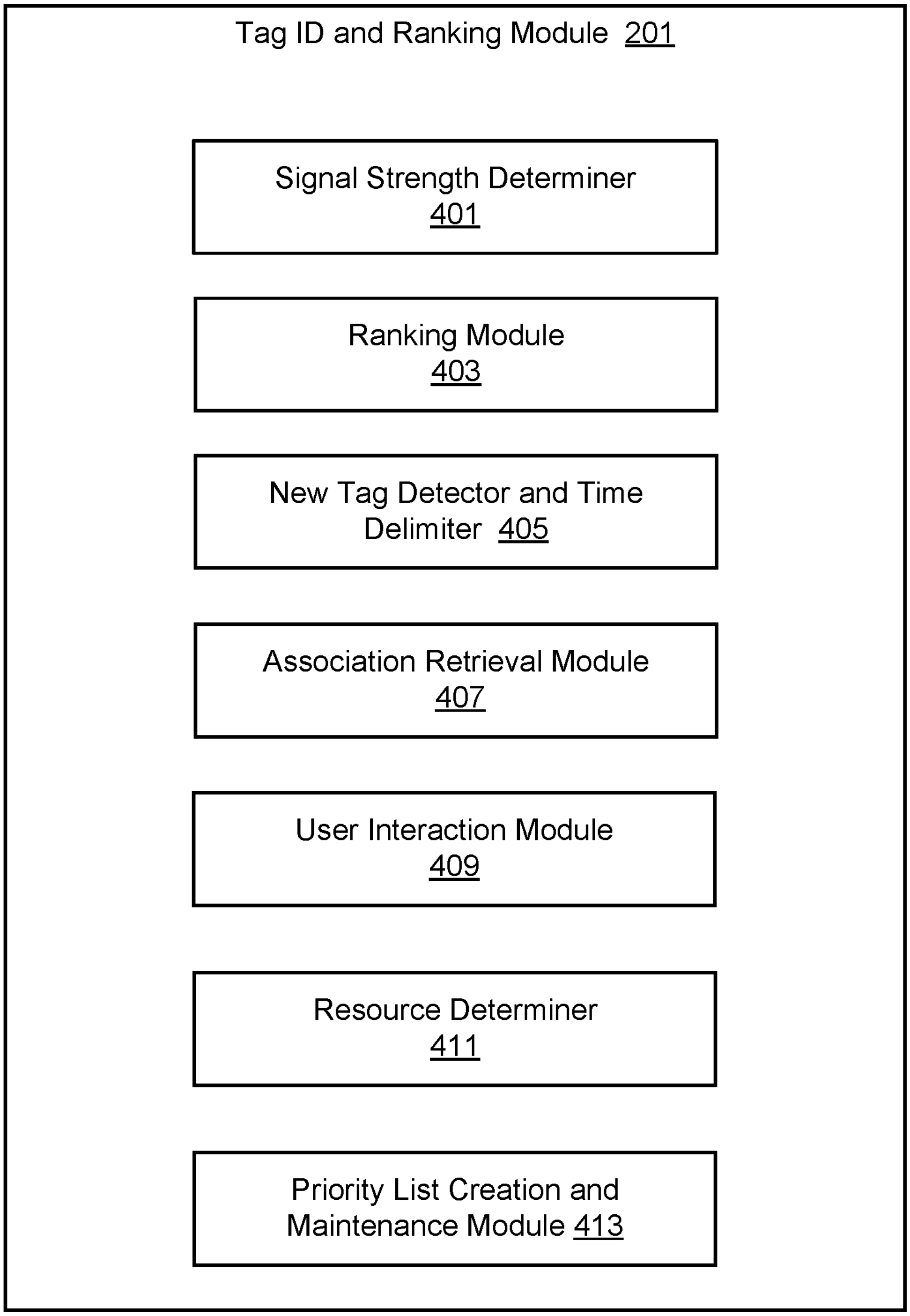
FIG. 4 depicts a block diagram illustrating an implementation of a tag identification and ranking module.

FIG. 4 shows an implementation of a tag identification and ranking module 201. In some implementations, the tag identification and ranking module 201 includes a signal strength determiner 401, a ranking module 403, a new tag detector and time delimiter 405, and association retrieval module 407, a user interaction module 409, a resource determiner 411, and a priority list creation and maintenance module 413. The components of the tag identification and ranking module 201 are communicatively coupled for communication with each other, and the other components of the system 100. The tag identification and ranking module 201 may include software and/or logic to provide the functionality they perform. In some implementations, the components can be implemented using programmable or specialized hardware including a field-programmable gate array (FPGA) or an application-specific integrated circuit (ASIC). In some implementations, the components can be implemented using a combination of hardware and software executable by processor 235. In some implementations, the components are instructions executable by the processor 235. In some implementations, the components are stored in the memory as depicted and are accessible and executable by the processor 235.

Figure 5:
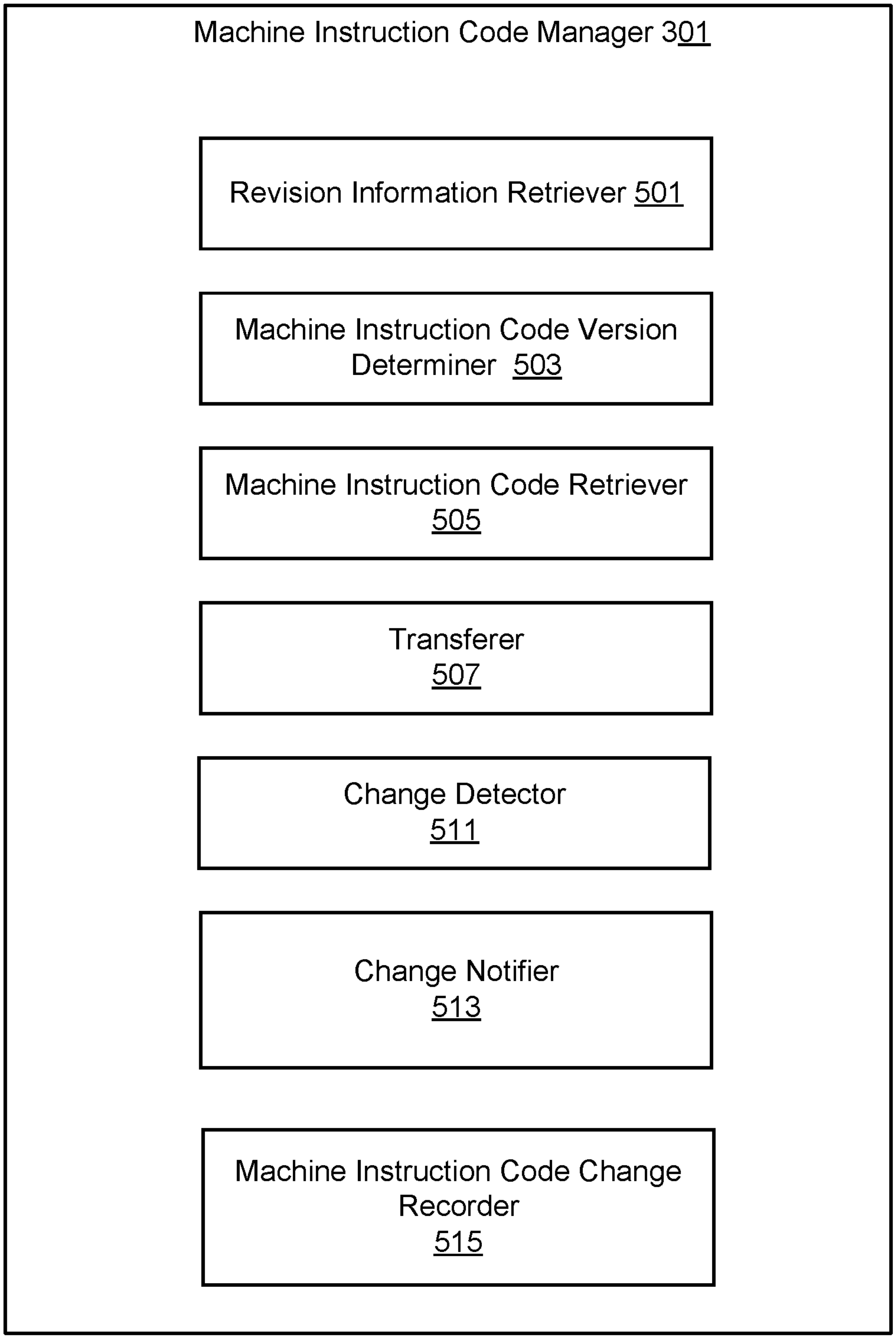
FIG. 5 depicts a block diagram illustrating an implementation of a machine instruction code manager.
Figure 6:
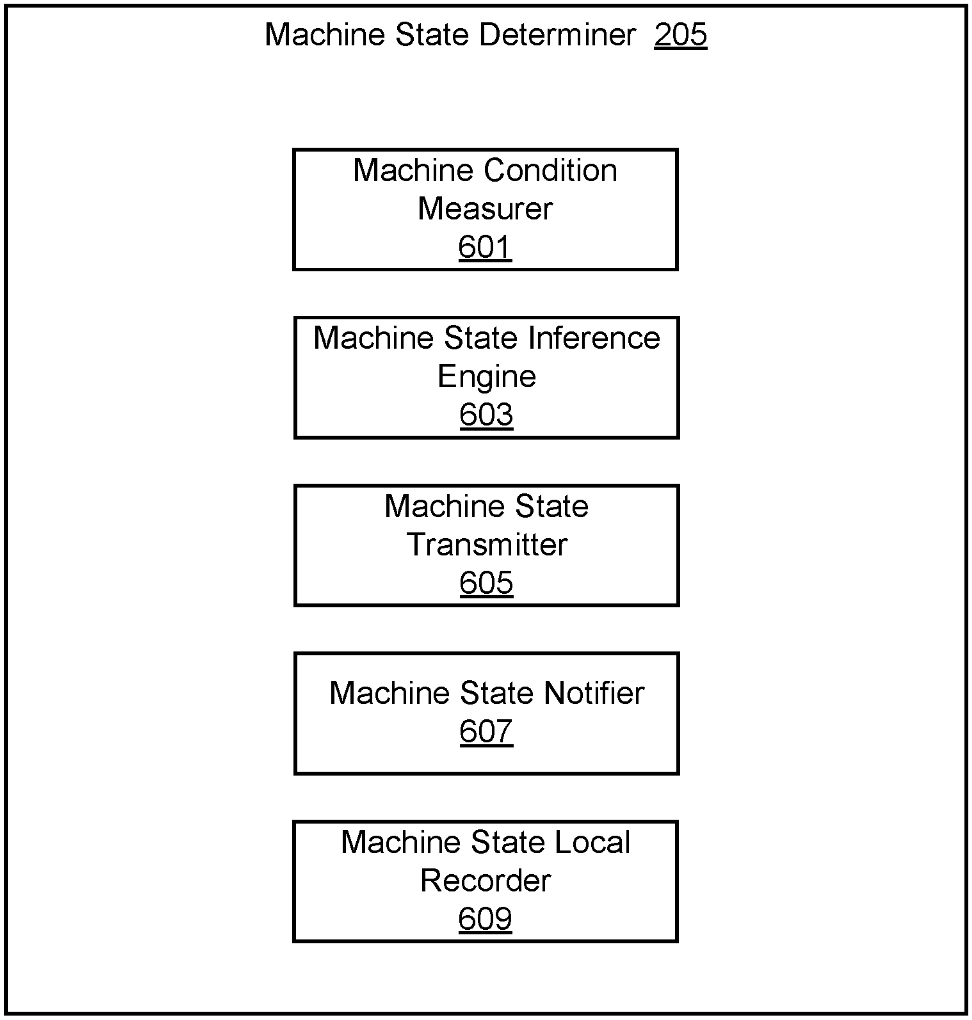
FIG. 6 depicts a block diagram illustrating an implementation of a machine state determiner.
Figure 7:
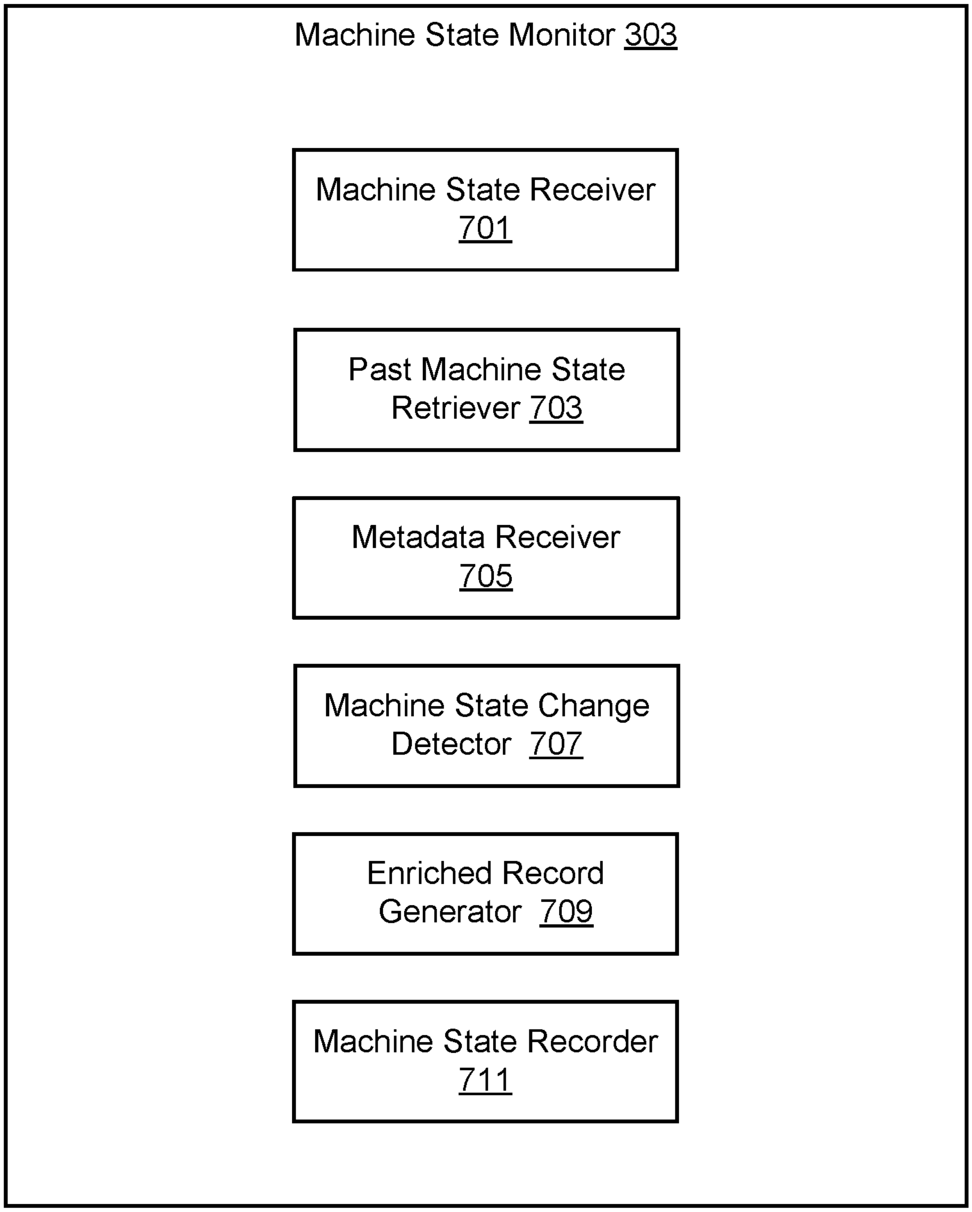
FIG. 7 depicts a block diagram illustrating an implementation of a machine state monitor.
Figure 8:
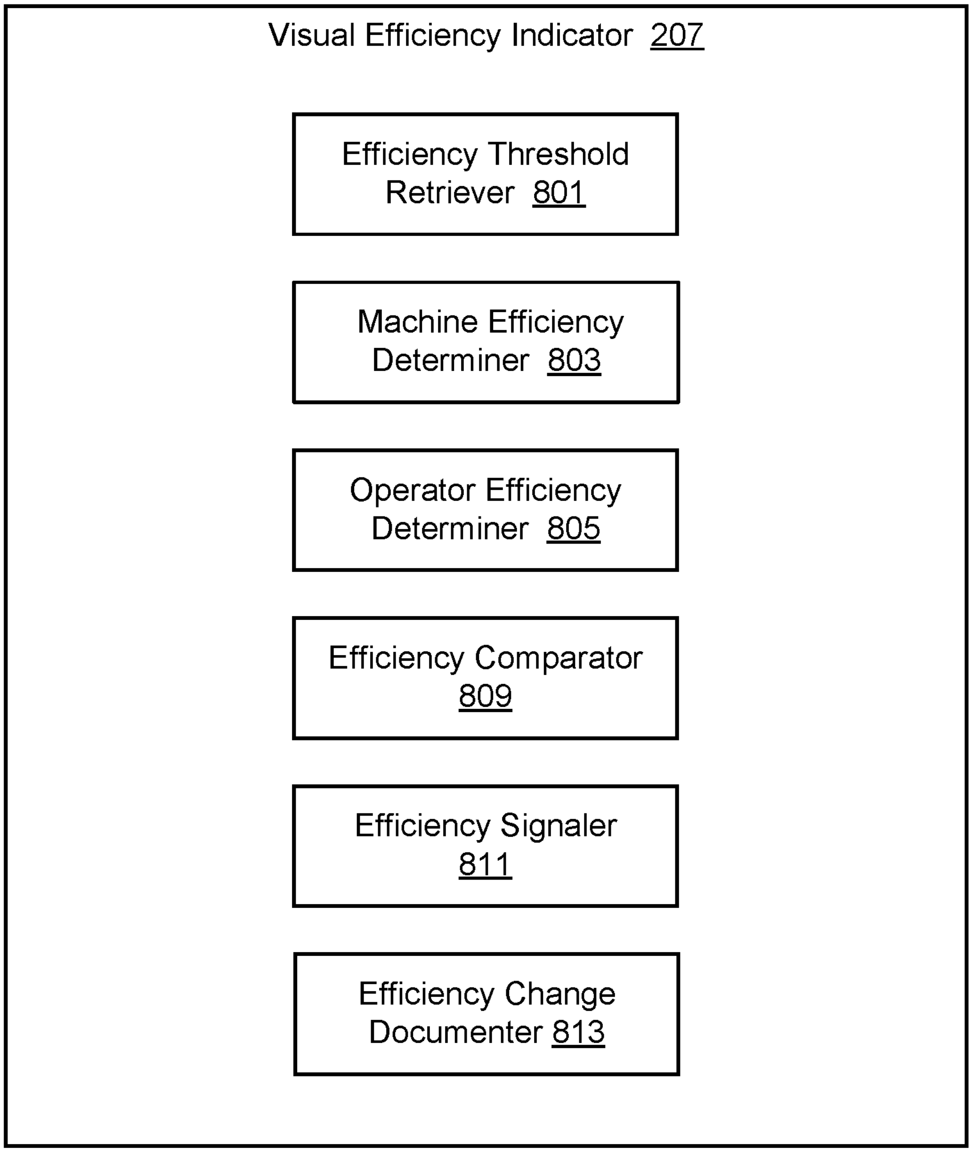
FIG. 8 depicts a block diagram illustrating an implementation of a visual efficiency indicator.
Figure 9:
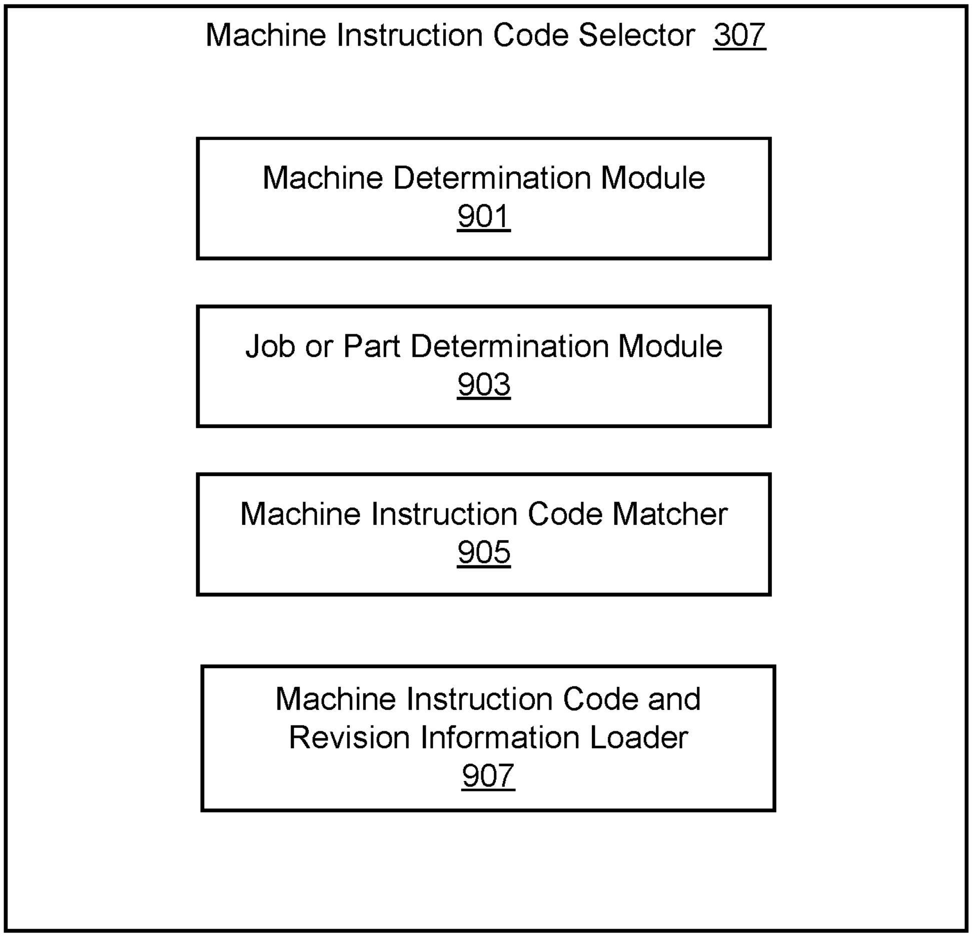
FIG. 9 depicts a block diagram illustrating an implementation of a machine instruction code selector.
Figure 10:
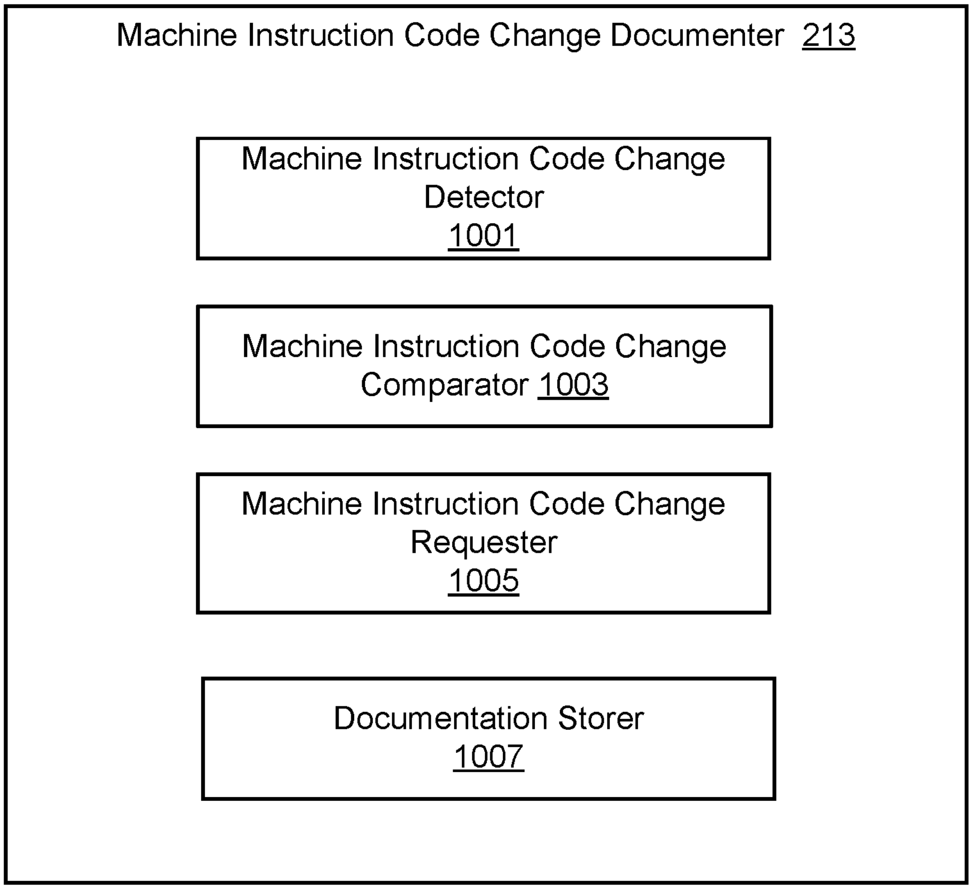
FIG. 10 depicts a block diagram illustrating an implementation of a machine instruction code change documenter.
Figure 11:
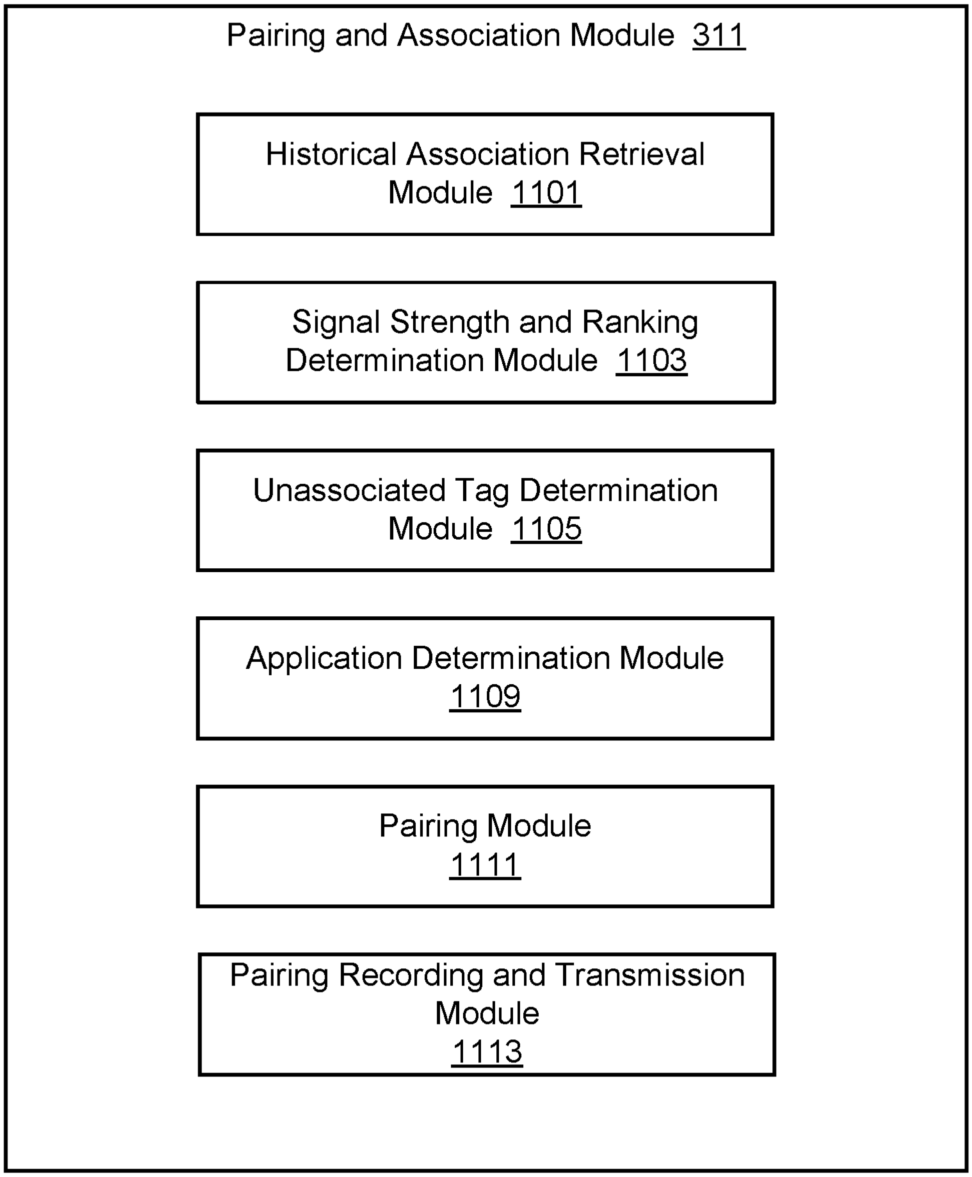
FIG. 11 depicts a block diagram illustrating an implementation of a pairing and association module.
Figure 12:
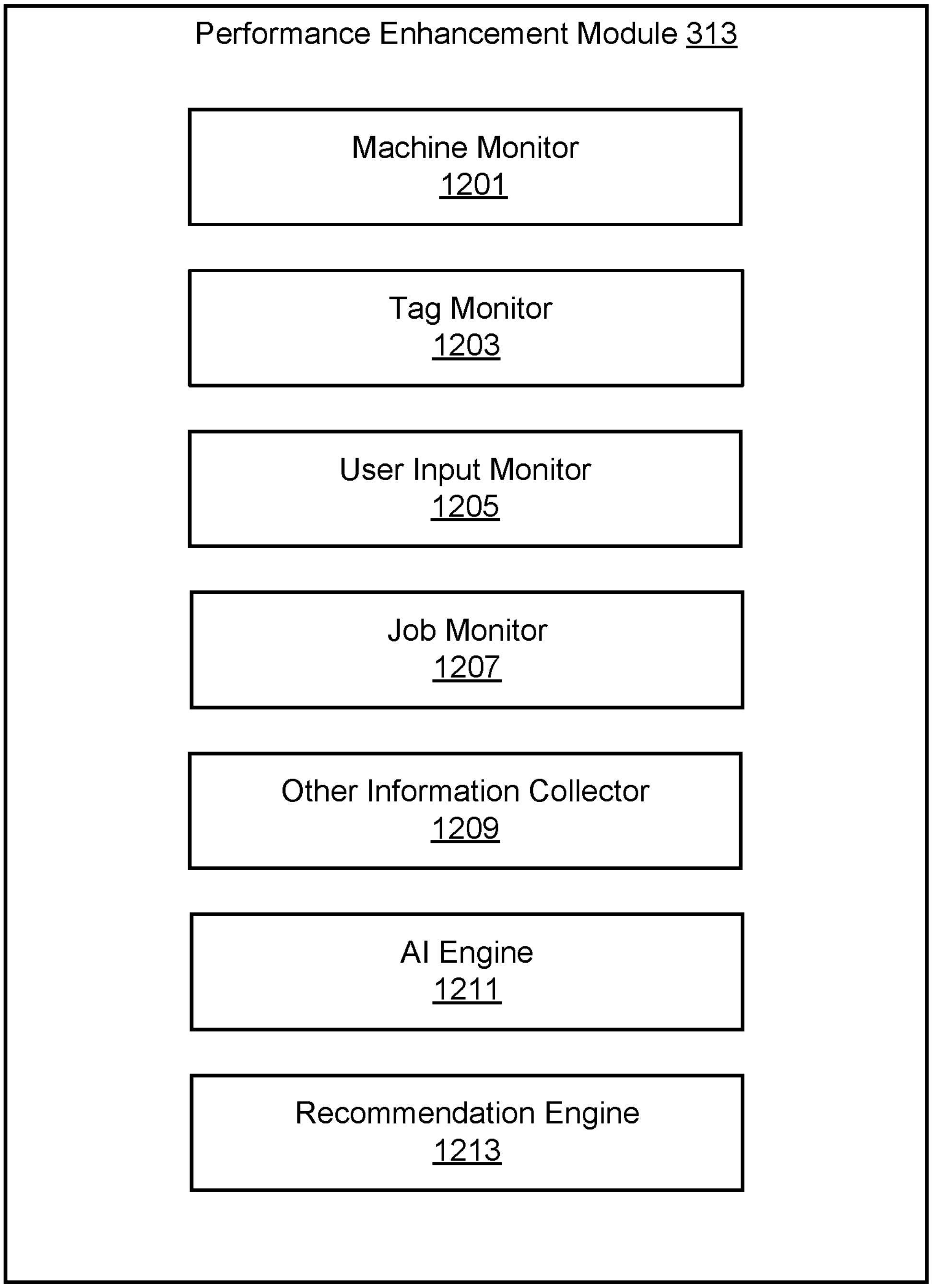
FIG. 12 depicts a block diagram illustrating an implementation of a performance enhancement module.

Similarly, the components of the machine instruction code manager 301 of FIG. 5, the machine state determiner 205 of FIG. 6, the machine state monitor 303 of FIG. 7, the visual efficiency indicator 207 of FIG. 8, the machine instruction code selector 307 of FIG. 9, the machine instruction code change detector 213 of FIG. 10, the pairing and association module 311 of FIG. 11, and the machine instruction code enhancement module 313 of FIG. 12 may each be respectively coupled for cooperation and communication with their respective components as well as the other components of the harmonization device 106, the server 130, the client 132, and the system 100. The machine instruction code manager 301, the machine state determiner 205, the machine state monitor 303, the visual efficiency indicator 207, the machine instruction code selector 307, the machine instruction code change detector 213, the pairing and association module 311, and the machine instruction code enhancement module 313 may each include software and/or logic to provide the functionality they perform. In some implementations, their respective components can be implemented using programmable or specialized hardware including a field-programmable gate array (FPGA) or an application-specific integrated circuit (ASIC). In some implementations, their respective components can be implemented using a combination of hardware and software executable by processor 235. In some implementations, their respective components are instructions executable by the processor 235. In some implementations, their respective components are stored in the memory as depicted and are accessible and executable by the processor 235.

The signal strength determiner 401 may be steps, processes, functionalities, software executable by a processor, or a device including routines to determine a signal strength associated with each tag 104, 112, 116, and 120 that is detected by the tag reader 233. In some implementations, the tag reader 233 is able to detect a plurality of tags concurrently. Any tag within a range (e.g., 30 feet) of the tag reader 233 may be detected and is considered active. In some implementations, the tag reader 233 includes a digital signal processor that is able to determine the amplitude of the signal generated by each tag 104, 112, 116, and 120, and received by the tag reader 233. In some implementations, either the tag reader 233 or the signal strength determiner 401 maintains a list of active tags (tags within read range) in memory 237 or data store 243. In some implementations, a history of tags that have been active as well as their last known signal strength may also be stored as part of list. The signal strength determiner 401 is coupled to exchange information with the tag reader 233. The signal strength determiner 41 is also coupled to provide the signal strength of the tags 104, 112, 116, and 120 that are active to the ranking module 403. Either the signal strength determiner 401 or the tag reader 233 also provides the identification number associated with each active tags 104, 112, 116, and 120 to the other components of the tag identification and ranking module 201.

The ranking module 403 may be steps, processes, functionalities, software executable by a processor, or a device including routines to for ranking the tags 104, 112, 116 and 120 that are active. In some implementations, the ranking module 403 ranks the active tags solely based upon the signal strength of each tag 104, 112, 116, and 120 determined by the signal strength determiner 401. Unassociated tags are maintained and presented in order of signal strength for new associations. In some implementations, the ranking module 403 may use other signals in addition to the signal strength to rank each tag 104, 112, 116, and 120. For example, the ranking module 43 may receive other information such as the tag identification information or prioritization information associated with the tag 104, 112, 116, and 120, and the ranking module 43 may include logic to rank the order in which to process the tag 104, 112, 116, and 120 based on both signal strength and these other signals. In another example, if the tag 112 is for a job 110 and the job 110 is assigned a high priority, that tag 112 may be processed first despite it having a signal strength less than other tags 104, 112, 116, and 120 in active range. In yet another example, the ranking module 403 may rank groups of tags using association information from the association retrieval module 407. For example, if there are multiple job tags 110 near the harmonization device 106, a first job and its associated tags 104, 112, 116, and 120 may be giving higher rank than a second job and its associated tags 104, 112, 116, and 120. More specifically, if a tool or inventory asset for the second job is not within active range of the tag reader 233, but the tags 104, 112, 116, and 120 for all the tools, inventory assets and operator for the first job are within range of the tag reader 233, the ranking module 403 may prioritize the first job, and its associated tag 110 over the second job. It should be understood that various other priorities and ranking may be performed by the ranking module 403 based upon signal strength, tag identification information, associated tag information, user input regarding processing priority, user input regarding tag priority or a variety of other factors that can be determined by the tag information and ranking module 201. The ranking module 403 provides its ranking information to the priority list creation and maintenance module 413. The ranking module 403 is coupled to the tag reader 233, the association retrieval module 407, the user interaction model 409 and the priority list creation and maintenance module 413.

The new tag detector and time delimiter 405 may be steps, processes, functionalities, software executable by a processor, or a device including routines to determine when new tags 104, 112, 116, and 120 come within range of the tag reader 233. The new tag detector and time delimiter 405 provides an indication to the ranking module 403 and the priority list creation and maintenance module 413 when a new tag comes within range of the tag reader 233. In some implementations, the new tag detector and time delimiter 405 also signals when a tag is not within range of the tag reader 233. In some implementations, the new tag detector and time delimiter 405 may also generate a signal indicating when a tag 104, 112, 116, and 120 has been within an active range of the tag reader 233 beyond a predetermined amount of time. The new tag detector and time delimiter 405 is coupled to provide signals indicating a new tag, a tag within active range beyond a predetermined amount of time, and a tag out of range to the priority list creation and maintenance module 413, the resource determiner 411, and the ranking module 403. The new tag detector and time delimiter 405 is also coupled to the association retrieval module 407 to receive information associated with a tag identification number.

The association retrieval module 407 may be steps, processes, functionalities, software executable by a processor, or a device including routines to retrieve information about a given tag from the server 130, the client 132, the data store 136 or the customer data store 138. The association retrieval module 407 is coupled to the tag reader 233 to receive the tag identification number of any tag 104, 112, 116, and 120 within range of the tag reader 233. The association retrieval module 407 uses the received tag identification number to query the server 130 to retrieve other information associated with a tag identification number. For example, the association retrieval module 407 may retrieve information about the tag as to whether it corresponds to a user 102, a job 110, a tool 114 or an inventory item 118. In another example, a tag 110 may represent a job, and the resources needed for that job may be determined by the association retrieval module 407 retrieving that information from the server 130. Additionally, it may retrieve a variety of information associated with the tag 104, 112, 116, and 120 including but not limited to a name, what other tags that is paired with, past locations, associations with jobs, employee demographic information, equipment for rent parameters, job production details, quantity of product, and a variety of other information from the internal database on data store 136 or enterprise resource planning (ERP) information on the customer data store 138. The association retrieval module 407 is coupled to the server 130, the client 132, the data store 136 or the customer data store 138. The association retrieval module 407 is also coupled to the other components of the tag identification and ranking module 201 to provide information it receives. Similarly, the association retrieval model 407 may be coupled to other elements of the harmonization device 106 to provide information retrieved about a particular tag.

The user interaction module 409 may be steps, processes, functionalities, software executable by a processor, or a device including routines to receive information from users of the system 100. For example, the user interaction model 409 may be coupled to the input device 231 of the harmonization device 106 to receive input from a user 102. Similarly, the user interaction module 409 may be coupled to receive information from a user of a client device 132. The user interaction module 409 cooperates with these devices to allow or present interfaces by which a user 102 or a user of the client device 132 can select a desired tag 104, 112, 116, and 120 for a particular operation or application. In some implementations, the user interaction module 409 received input from the user regarding associations of data to tags 104, 112, 116, and 120 and association between tags 104, 112, 116, and 120. In some implementations, the user interaction module 409 can also receive input on how ranking is to be performed which is provided to the ranking module 403. For example, user input may set the ranking module 403 to determine ranking solely on signal strength, and to select the highest strength user tag 104 and automatically present work options for that employee as they walk up to the harmonization device 106. The user interaction module 409 is coupled to the input device 231 and the display device 239 of the harmonization device 106. The user interaction module 409 is also coupled to the client 132 and server 130.

The resource determiner 411 may be steps, processes, functionalities, software executable by a processor, or a device including routines to determine resources available based upon whether a tag 104, 112, 116 and 120 is found to be active by the tag reader 233. The resource determiner 411 combines information from the signal strength determiner 401, the ranking module 403, the new tag detector and time delimiter 405, the association retrieval module 407 and the user interaction module 409. The resource determiner 411 organizes that information and generates a list of all the resources that are within range of the machine 108 corresponding to the harmonization device 106. In some implementations, the resource determiner 411 provides this real-time and updates the list in real-time as different tags 104, 112, 116, and 120 move in and out of active range of the tag reader 233. Essentially, the resource determiner 411 provides information about all the resources that are within an active range of the tag reader 233 at a given time. The resource determiner 408 outputs this information to the priority list creation and maintenance module 411. The resource determiner 411 is coupled to the other elements of the tag identification ranking module 201 to facilitate its collection, outputting, and organization of information.

The priority list creation and maintenance module 413 may be steps, processes, functionalities, software executable by a processor, or a device including routines to create a list of an order in which the active tags 104, 112, 116, and 120 should be processed. The priority list creation and maintenance module 413 generates this priority list based on signals from ranking module 403, the new tag detection and time delimiter 405, the association retrieval module 407, the user interaction module 409 and the resource delimiter 411. In one implementation, the priority list is based on job tag 110 with the highest signal strength. In another implementation, the priority list is based upon the job tag 110 that and the highest signal strength and has all the resources needed to complete the job in an active range of the harmonization device 106. In yet another implementation, the priority list is based upon the job tag 110 that has associated information with the highest priority assigned to the job tag. It should be understood that the priority list may be ordered using a variety of different criteria based on what is most important to the manufacturing facility owner. It should also be understood that the criteria for determining the priority list may be different at one time versus another time. The criteria used for determining the priority list may change over time depending on what is most important in terms of production by the manufacturing facility. The priority list creation and maintenance module 413 also cooperates with the display device 239 of the harmonization device 106 to show the priority list and the order of jobs 110 and users 102 for using the machine 108 associated with the harmonization device 106. The priority list creation and maintenance module 413 also maintains associations between tags 104, 112, 116, and 120 and resources, as well as its data that describes individual resources. Resource data can include employee demographic information, equipment parameters, and job production details such as quantity of production desired, status, quality of production, timing of production etc. The priority creation and maintenance module 413 is coupled to receive and store this information in the data store 243 of the harmonization device 106. It should be understood that the priority creation and maintenance module 413 may also store this information in other external databases or ERP systems or any combination thereof.

One example of the operation of the tag identification ranking module 201 is as follows: an RFID tag or sticker is attached to the back of the badge of an employee. The number of the RFID tag is associated with that employee in a database of the data store 136. The employee wearing his badge approaches a work area where the harmonization device 106 having the tag reader 233 is located. The tag reader 233 reads RFID tag the codes the identification number of the tag. The association retrieval module 407 receives the identification number of the RFID tag, and queries the data store, and receives the employee identification number associated with the RFID tag. The association retrieval model 407 uses the employee identification number to retrieve other relevant information about the employee, for example from a traditional business system. The employee is able to use the harmonization device 106 to perform functions on the ERP system such as clocking in, starting activities, tracking performance, clocking out, etc.

An example tag identification process may be as follows. The tag reader 233 of the harmonization machine 106 continually scans for all tags 104, 112, 116, and 120 in an area, retrieves the identification number for each tag 104, 112, 116, 120. When a "new" tag 104, 112, 116, 120 is detected within the range of the tag reader 233, meaning it has not been in range of the reader 233 for a certain amount of time, the association retrieval module 407 retrieves the information associated with the tag 104, 112, 116, 120 from the server 130. The resource determiner 411 determines if that tag 104, 112, 116, 120 is associated with a user 102, job 110, tools 114, or an inventory item 118 based on the information from the association retrieval module 407. If the tag 104, 112 corresponds to a user 102 or a job 110, the tag identification ranking module 201 sends the information to the user interface module 211 so that a message indicating that the user 102 or the job 110 is an available for an activity is presented on the display device 239. For example, if user A 102 walks up wearing his RFID tag 104 and carrying a job 110 (e.g., traveler or document describing the job) with an attached RFID tag 112, the display 239 will be updated to show the user A's name on the screen. When user A clicks his name on the input device 231, the harmonization device 106 will present a message on a display asking if user A wants to start an activity (on the machine 108 associated with the harmonization device 106) on the job 110 that was identified via RFID. In some implementations, if more than one job 110 is detected via RFID tag 112, tag identification and ranking module 201 will show them all the jobs and have user A select the correct one.

FIG. 5 shows an implementation of a machine instruction code manager 301. In some implementations, machine instruction code manager 301 includes a revision information retriever 501, a machine instruction code version determiner 503, a machine instruction code retriever 505, a transfer 507, a change detector 511, a change notifier 513, and a machine instruction code change recorder 515. The machine instruction code manager 301 advantageously controls the storage of machine instruction code in a database, the uploading of machine instruction code, the monitoring for changes to machine instruction code, the documenting of changes, and the storage of revised machine instruction code to the database. In essence, the machine instruction code manager 301 covers the full lifecycle of how machine instruction code is stored, uploaded, used, and modified to provide control over which machine instruction code is used, how machine instruction code is updated and verified to ensure efficient and optimized operation of the machines 108 on the manufacturing facility floor.

The revision information retriever 501 may be steps, processes, functionalities, software executable by a processor, or a device including routines to retrieve information that can be used to determine the machine instruction code to be loaded onto a machine 108. The revision information retriever 501 retrieves the information needed to determine the machine instruction code to be sent to the harmonization device 106 for loading on its respective machine 108. This information may include the harmonization device 106 making the request, the machine 108 associated with the harmonization device, the type of machine 108 and its characteristics, the active tags 104, 112, 116, and 120 within reading range of the harmonization device 106, the information associated with the active tags 104, 112, 116, and 120, for example, what users 102, jobs 110, tools 114 and inventory items 118 correspond to the active tags 104, 112, 116, and 120 and characteristics of users 102, jobs 110, tools 114 and inventory items 118. For example, this information may include what type of the inventory item 118 is or what activity of a job is going to be performed, or what tool 14 will be used. The revision information retriever 501 is coupled to provide this information to the program version determiner 503.

The machine instruction code version determiner 503 may be steps, processes, functionalities, software executable by a processor, or a device including routines to determine what machine instruction code or set of machine instruction code files should be retrieved by the machine instruction code manager 301. The system 100 may include thousands of machine instruction code files to operate machines 801 in an automated manner. The machine instruction code is saved in a database with associated revision control information. For example, these machine instruction code files may be stored in databases on data store 243, 136, or 138. This revision control information specifies a variety of characteristics about the machine instruction code such as what machines 801 can use the machine instruction code, the part to which the machine instruction code applies, the job type of the machine instruction code, what types of operators or operations the machine instruction code is for, and any other attributes necessary to define one activity within a job that the machine instruction code can perform in an automated manner. The machine instruction code version determiner 503 receives the information about the users 102, jobs 110, tools 114 and inventory items 118 corresponding to the active tags 104, 112, 116, and 120 and characteristics of users 102, jobs 110, tools 114 and inventory items 118. This information can be used by the machine instruction code version determiner 5032 search the database for the appropriate machine instruction code to be loaded for a given activity. The machine instruction code version determiner 503 then determines a set of machine instruction code files that may be used for a given activity based on the information from the revision information retriever 501. The machine instruction code version determiner 503 may find only a single machine instruction code file for loading. However, the machine instruction code version determiner 503 may find several different versions of the machine instruction code for performing the same activity given the information received from the revision information retriever 501. In one implementation, the machine instruction code version determiner 503 identifies a single and best machine instruction code based upon information is received about the activity of a particular job 110. In another implementation, the machine instruction code version determiner 503 identifies a set of machine instruction code files that will be sent to the harmonization device 106 and presented to the user 102, and the user can select which machine instruction code file to use by selecting with the input device 231 of the harmonization device 106. The particular machine instruction code or set of machine instruction code files identified by the machine instruction code version determiner 503 is sent to the machine instruction code retriever 505.

The machine instruction code retriever 505 may be steps, processes, functionalities, software executable by a processor, or a device including routines to retrieve one or more machine instruction code files from a database and store that machine instruction code in the internal memory of the server 130. The machine instruction code retriever 505 receives machine instruction code or set of machine instruction code files identified by the machine instruction code version determiner 503. The machine instruction code retriever 505 uses this information to access a database storing thousands of machine instruction code files on data store 243, 136, or 138. The machine instruction code retriever 505 retrieves the identified machine instruction code or set of machine instruction code files and makes them available to the transfer 507.

The transfer 507 may be steps, processes, functionalities, software executable by a processor, or a device including routines to transfer one or more machine instruction code files to the machine instruction code loading module 203 of the harmonization device 106. The transfer 507 is coupled to the internal memory of the tracking, measuring, and optimization application 134 to retrieve the one or more machine instruction code files stored there by the machine instruction code retriever 505. In some implementations, the transfer 507 receives the machine instruction code files directly from the machine instruction code retriever 505. In one implementation, the transfer 507 sends the machine instruction code retrieved by the machine instruction code retriever 505 to the machine instruction code loading module 203 of the harmonization device 106 via wired or wireless communication. In another implementation, the transfer 507 copies the machine instruction code retrieved by the machine instruction code retriever 505 to a physical media, e.g., a USB device, that a user 102 can take and insert into a port of the harmonization device 106 and it will be sent to the machine instruction code loading module 203 for processing. In another implementation, the transfer 507 copies the machine instruction code retrieved by the machine instruction code retriever 505 to internal storage memory, which is used to emulate a USB device, and transferred to the machine via a USB cable. In this instance, the harmonization device 106 acts as a virtual USB drive from the perspective of the machine 108.

The change detector 511 may be steps, processes, functionalities, software executable by a processor, or a device including routines to determining any changes made to the operation of the machine instruction code by the user 102. When a user 102 is operating a machine 108 that has been loaded with machine instruction code to automate the process, there are instances when the user 102 may modify the operation of the machine instruction code on the machine 108 to effectively implement different automated process. These changes by the user 102 are recorded by the change documenter 213 of the harmonization device 106. These changes are sent to the change detector 511 of the tracking, measuring and optimization application 134. The change detector 511 determines the original machine instruction code sent to a given machine and the modified machine instruction code based upon user 102 changes made to the machine instruction code on the machine 108. The change detector 511 also generates a change record or document that clearly highlights the difference and changes between the original machine instruction code and the modified machine instruction code. Since the machine instruction code files are thousands of lines long and are generally not human readable (use machine codes and numbers that most people don't understand), the change detector 511 creates human usable documentation of the changes. This is particularly advantageous because parsing the code looking for changes is an extremely tedious and difficult task. In some implementations, the changes are documented in a format and layout that allows any person to see the change. In some implementations, the change document is formatted such that it can be automatically applied to the existing machine instruction code, for example, essentially like a revision commit that can be applied directly and programmers don't have to make the change by hand. The change detector 511 then sends the original machine instruction code, the modified machine instruction code, and the change document to the machine instruction code change recorder 515.

The change notifier 513 may be steps, processes, functionalities, software executable by a processor, or a device including routines to notify and confirm changes made by the user 102. In some implementations, the change notifier 513 cooperates with the harmonization machine to present the changes detected by the change detector 511 to the user 102 for confirmation. The change notifier 513 presents the changes detected by the change detector 511 to the user 102 on the display device 239 of the harmonization device 106. The user 102 can review the change document and use the input device 231 to confirm that the user 102 once the changes are incorporated into the modified program for future work. Once the user has confirmed the change, the change notifier 513 since the change document to a formal notification system that tracks the changes. The user 102 can confirm the machine instruction code change(s) were requested and can track the status of the review using the harmonization device 106. Administrators can assign groups of users who are assigned to review and incorporate those changes to review the change document. Depending on the severity/urgency of the changes, different methods of delivery to the administrators can be specified (email, text, call, etc.) The status of the change request is logged and is visible for future tracking. Managers or engineers can track the velocity of changes for certain user 102, jobs 110 or machines 108 (e.g., are operators making changes, is job XYZ riddled with machining errors, is machine ABC frequently requiring machine instruction code changes). The change notifier 513 is coupled to receive the original machine instruction code, the modified machine instruction code, and the change document from the change detector 511. The change notifier 513 is also coupled for communication and cooperation with a formal notification system (not shown).

The machine instruction code change recorder 515 may be steps, processes, functionalities, software executable by a processor, or a device including routines for making record of any machine instruction code changes made by users 102. The machine instruction code change recorder 515 receives the original machine instruction code, the modified machine instruction code, and the change document, and stores the modified machine instruction code and the change document in the database. In some implementations, the machine instruction code change recorder 515 uses the original machine instruction code to search the database and identify where the modified machine instruction code in the change document should be stored. The machine instruction code change recorder 515 is coupled to the data store 243, 136, and 138 for storage of this information.

FIG. 6 depicts an implementation of a machine state determiner 205. In some implementations, the machine state determiner 205 includes a machine condition measurer 601, machine state inference engine 603, a machine state transmitter 605, a machine state notifier 607, and a machine state local recorder 609.

The machine condition measurer 601 may be steps, processes, functionalities, software executable by a processor, or a device including routines to measure the operational condition of the machine 108. For example, a variety of different characteristics of the machine condition can be determined and measured by the machine condition measurer 601 including: analog signals emitted by the machine 108, detected current in the form of voltage or amperage used by the machine 108, signals generated by optical sensors, acoustic centers or thermal sensors associated with or by the machine 108, outputs etc. In some implementations, the machine condition measurer 601 may also access the machine 108 directly and retrieve condition measures by physical connection to a programmable logic controller, for example, via an Ethernet API, and RS-232 bus, or a controller area network (CAN) bus. In some implementations, the machine condition measurer 601 also communicates with the tag ID and ranking module 2012 to collect other metadata including the identification number for tags 104, 112, 116 and 120 that are active at a given time when a machine state information is measured. The machine condition measurer 601 is coupled to provide information about the machine condition and metadata to the machine state inference engine 603.

The machine state inference engine 603 may be steps, processes, functionalities, software executable by a processor, or a device including routines to determine a machine state based on the signals received from the machine condition measurer 601. For example, the machine state inference engine 603 may determine the state of a given machine 108 by observing/calculating the following factors: activity state (running, stopped, interrupted, emergency stop, idle, among others), machine instruction code running (the file name of the machine instruction code actively running on the machine), time the activity was started and stopped, which employee was running the machine, which job was running, which part was running, which operation was running, among many other related data items. In some implementations, the machine state is also inferred based on the pattern of the signals measured and the frequency of the signals. In some implementations, the machine state inference engine 603 tracks machine state and if it is different from a prior inferred state it generates a machine state record. The machine state record may be supplemented with available metadata including equipment identification number, user identification number, job identification number, etc. In some implementations, the machine state interface engine 603 analyzes the machine state records and other information, for example, using artificial intelligence, to determine whether the current state of a machine 108 requires immediate attention by a user 102, management, or maintenance. The machine state inference engine 603 is coupled to receive information from the machine condition measurer 601 and outputs the machine state information and records to the machine state transmitter 605, the machine state notifier 607 and the machine state local recorder 609.

The machine state transmitter 605 may be steps, processes, functionalities, software executable by a processor, or a device including routines to send the state machine information or records to the tracking, measuring, and optimizing application 134. The state machine transmitter 605 is coupled to the machine state inference engine 603 to receive machine state information or records. The machine state transmitter 605 sends the machine state information to the machine state monitor 303 of the tracking, measuring, and optimizing application 134. In some implementations, these machine state records are sent immediately upon receipt to the machine state monitor 303. In other instances, machine state records are temporarily stored in memory 237 and then periodically sent to the machine state monitor 303. In some implementations, the machine state transmitter 605 also receives state metadata from the machine condition measurer 601 or the machine state inference engine 603. The machine state transmitter 605 is coupled to the communication unit 241 of the harmonization device 106 to send the state machine information and metadata over the network 124 to the server 130.

The machine state notifier 607 may be steps, processes, functionalities, software executable by a processor, or a device including routines to the user 102, maintenance, or management regarding a particular state of a machine 108. The machine state notifier 607 is coupled to the machine state inference engine 607 to receive any indication and associated state information indicating that the user 102, maintenance, or management should be notified of the current state of the machine 108. In the case of the user 102, the machine state notifier 607 communicates with the display device 239 to present state information that a machine state needs immediate attention to the user 102 currently operating the machine 108. For maintenance or management, the machine state notifier 607 sends the message to the tracking, measuring and optimization application 134 of the server 130 so that the state information can be sent to the appropriate party such as being transmitted to other systems like an ERP system, management system, or other system to which the tracking, measuring and optimization application 134 is coupled.

The machine state local recorder 609 may be steps, processes, functionalities, software executable by a processor, or a device including routines to store machine state information, machine state record, and machine state metadata locally at the harmonization device 106. The machine state local recorder 609 behaves similar to the machine state transmitter 605 but instead of sending the information external to the harmonization device 106, the machine state local recorder 609 stores the machine state information and records in the data store 243 of the harmonization device 106. Since the harmonization device 106 has network conductivity, this allows users 102 or other parties using the server 130 or client device 132 to retrieve historical information about the state of the machine 108. The machine state local recorder can store the state information immediately upon receipt or periodically to a database in the data store 234.

FIG. 7 shows an implementation of a machine state monitor 303. In some implementations, the machine state monitor 303 includes a machine state receiver 701, a past machine state retriever 703, a metadata receiver 705, a machine state change detector 707, and an enriched record generator 709, and machine state recorder 711. The machine state monitor 303 performs functions similar to the machine state determiner 205 that is operational on the tracking, measuring and optimization application 134 of the server 130.

The machine state receiver 701 may be steps, processes, functionalities, software executable by a processor, or a device including routines to receive machine state information sent by any number of machines 108*a*-108*n* on the facility floor. As shown in FIG. 1A, there may be several machines 108*a*-08*n* at a given facility to which the state machine receiver 701 is coupled for communication. The machine state receiver 701 is coupled to the machine state transmitter 605 of each machine 108*a*-108*n*. The machine state receiver 701 receives machine state information and machine state records from all of those machines 108*a*-108*n*.

The past machine state retriever 703 may be steps, processes, functionalities, software executable by a processor, or a device including routines to retrieve past state information about any machine 108*a*-108*n*. In some implementations, the past state machine retriever 703 communicates with the machine state local recorder 609 of a given machine state determiner 205 to retrieve the past machine state information for that machine 108. In some implementations, the past machine state retriever 703 accesses the data store 243 of the server 130 to retrieve the past state machine information. Preferably the past machine state retriever 703 attempts retrieve the data first from the data store 243 of the server 130, and if the information is not present in the data store 243, it requests the information from the machine state local recorder 609.

The metadata receiver 705 may be steps, processes, functionalities, software executable by a processor, or a device including routines to receive metadata from any one of the machines 108*a*-108*n* on facility floor. The metadata receiver 705 may parse the same signals received by the machine state receiver 701 and filter out the metadata. In some implementations, the metadata receiver 705 communicates with the machine state local recorder 609 to receive the metadata. In still another implementation, the metadata receiver 705, retrieves it from the machine state inference engine 603 if it is available. The metadata receiver 705 is also coupled to send the data it receives to the enriched record generator 709.

The machine state change detector 707 may be steps, processes, functionalities, software executable by a processor, or a device including routines to detect changes in machine state. The machine state change detector 707 is coupled to the machine state receiver 701 and the past machine state retriever 703 to receive information about a machine's past state and its current state. The machine state change detector 707 compares a machine's past state to its current state and generates a notification depending on the change of state. In some implementations, the machine state change detector 707 may analyze the states of a group or subset of machines 108. For example, assuming a manufacturing facility floor has three machines 108 that are drills. If all three of the machines 108 are inoperable or need maintenance, the machine state change detector 707 can generate notifications are records that can prioritize for attention. Thus, the machine state change detector 707 can identify machine state changes for a single individual machine or a different groups of machines. The machines they change detector 707 may also generate and send notifications to other systems like ERP systems.

The enriched record generator 709 may be steps, processes, functionalities, software executable by a processor, or a device including routines to generate enriched records. Enriched records may be records that include state machine information and/or state machine records but also include other information such as metadata. It is advantageous to be able to analyze which particular users 102, jobs 110, tools 114, and inventory items 118 are located in range of a machine 108 at a given time when the state of the machine 108 changes. These enriched records can be used to perform additional analysis about whether particular users 102, jobs 110, or tools 114 are causing machines 108 to be more productive, less productive, require more maintenance, require less maintenance etc. The enriched record generator 709 retrieves machine state information from the machine state retriever 701 and receives machine metadata from the metadata receiver 705 and combines them to produce these enriched records. The enriched record generator 709 can store the enriched records in the data storage 243 of the server 130. The additional metadata added to the state machine information or records can also be used to search the machine state information. For example, if only machine state information about a particular job is wanted, the enriched records can be searched based on the job identification number. In some implementations, the enriched record generator 709 also retrieves resource descriptive data from the data store 243 and adds it to the enriched records that it creates.

The machine state recorder 711 may be steps, processes, functionalities, software executable by a processor, or a device including routines to store the machine state information, machine state records, metadata, and/or the enriched records in the data store 243 of the server. The machine state recorder 711 operates similar to the machine state local recorder 609, but stores the machine state information, machine state records, metadata, and/or the enriched records for several machines 108*a*-108*n* of the system 100.

FIG. 8 depicts an implementation of a visual efficiency indicator 207. In some implementations, the visual efficiency indicator 207 includes an efficiency threshold retriever 801, a machine efficiency determiner 803, an operator efficiency determiner 805, and efficiency comparator 809, and efficiency signaler 811, and an efficiency change documenter 813.

The efficiency threshold retriever 801 may be steps, processes, functionalities, software executable by a processor, or a device including routines to retrieve efficiency threshold values from the data store 243 of the server 120. In some implementations, there are efficiency thresholds defined by machine 108, defined by user 102, defined by both machine 108 and user 102 pair. It should be understood that a variety of other criteria or groupings may be used to define different efficiency measures which may have corresponding thresholds. The efficiency threshold retriever 801 retrieves the appropriate thresholds depending on the machine 108, the user 102, or other criteria being evaluated. It should be understood that the efficiency threshold retriever can retrieve a variety of other efficiency metrics from the data store 243 of the server 120. The efficiency threshold retriever 801 is coupled to the data store by bus 220 to retrieve the efficiency threshold values or other metrics. The efficiency threshold retriever 801 provides the retrieved information to the machine efficiency determiner 803 and the operator efficiency determiner 808.

The machine efficiency determiner 803 may be steps, processes, functionalities, software executable by a processor, or a device including routines to determine the efficiency of a given machine 108. In some implementations, the machine efficiency determiner 803 operates continuously in real-time for each machine 108*a*-108*n* on the manufacturing facility floor to track their efficiency over time. In other implementations, the machine efficiency determiner 803 determines efficiency on a machine-by-machine basis, a periodic basis, a job basis, a part basis etc. The machine efficiency determiner 803 is coupled to receive the efficiency threshold that must be satisfied from the efficiency threshold retriever 801. The machine efficiency determiner 803 is also coupled to the harmonization device 106 to retrieve a variety of measures of performance of the machine 108. For example, the machine efficiency determiner 803 may communicate with the time tracking module 215 or the quality tracking module 217 of a given machine 108. The machine efficiency determiner 803 may also communicate with the machine state monitor 303 to retrieve other information about machine performance. Based on the information that the machine efficiency determiner 803 receives the machine efficiency determiner 803 produces a machine efficiency value. The machine efficiency value produced by the machine efficiency determiner 803 is output to the efficiency comparator 809.

The operator efficiency determiner 805 may be steps, processes, functionalities, software executable by a processor, or a device including routines to determine the efficiency of user 102. In some implementations, this operator efficiency determiner 805 determines the efficiency of user alone. In other implementations, the operator efficiency determiner 805 determines the operational efficiency of the user on a per machine basis. The operator efficiency determiner 805 may generate the efficiency value for a user 102 on a real-time, continuous basis, a periodic basis, or other basis. For example, the operator efficiency determiner 805 may determine efficiency for user 102 only when the user 102 is clocked in for work and not during lunch or break times. The operational efficiency determiner is also coupled to the harmonization devices 106*a*-106*n* to retrieve the performance values for the user 102. In particular, the operator efficiency determiner 805 may be coupled to the time tracking module 215 and the quality tracking module 217 of each machine 108 that the user 102 accessed and worked with. The operator efficiency determiner 805 uses these sources of information to determine an efficiency value for user 102. The operator efficiency determiner 805 is coupled to provide the determined efficiency value for the user 102 to the efficiency comparator 809.

The efficiency comparator 809 may be steps, processes, functionalities, software executable by a processor, or a device including routines to determine whether performance by a machine 108 or user 102 satisfies an efficiency level. The efficiency comparator 809 is coupled to receive the efficiency threshold(s) from the efficiency threshold retriever 801. The efficiency comparator 809 is also coupled to receive a machine efficiency value from the machine efficiency determiner 803 and a user efficiency value from the operator efficiency determiner 805. The efficiency comparator 809 compares the efficiency values of the machine 108 to its respective efficiency threshold. Based on the comparison, the efficiency comparator 809 generates a signal indicating whether the efficiency comparator 809 determines that the machine 108 efficiency values satisfied the threshold. For example, for a given efficiency measure, there may be a plurality of thresholds, a first threshold indicating normal efficiency when satisfied, a second threshold indicating below normal efficiency when satisfied, and a third threshold unsatisfactory efficiency when satisfied. In particular, the first threshold may be 90% and signaled by a green light, the second threshold may be below 90% but greater than 60% and is signaled by yellow, and a third threshold may be below 60% and signaled by red. Similarly, the efficiency comparator 809 compares the efficiency values of a user 102 to the user's respective efficiency thresholds. Based on the results of the comparison, the efficiency comparator 809 generates one or more signals indicating the efficiency of the user 102. The signals generated by the efficiency comparator 809 are sent to the efficiency signaler 11 and the efficiency change documenter 813.

The efficiency signaler 811 may be steps, processes, functionalities, software executable by a processor, or a device including routines to generate and send signals that can be used by the harmonization machine 106 to signal either the efficiency of the machine 108 or the efficiency of the user 102, or both on the display device 239 of the harmonization device 106. In some implementations, the display device 239 may be a visual indicator that has customizable to display colors and patterns to convey efficiency on anyone or more metrics. As noted above, the efficiency of the machine 108, the efficiency of the user 102, the combination of the efficiency of the user 102 and the machine 108 together, or a variety of efficiencies on other metrics may be translated by the efficiency signaler 811 into visual indicators that provide a clear indication of satisfactory or non-satisfactory efficiency for a given metric. For example, the display device 239 may be programmable indicator lights in different colors and display patterns. For example, the display device 239 may be a series of highly visible LEDs with program colors and patterns. The efficiency signaler 811 of each harmonization device 106 can periodically assess its efficiency metrics and adjust the indicator lights to the appropriate color and display pattern. In another implementation, the efficiency signaler generates efficiency signals in real-time and continuously modifies the indicator lights and patterns for a machine 108 during operation by a user 102. In some implementations, the efficiency signaler 811 may provide the efficiency signals in real-time from the harmonization device 106 to the server 134 storage and display by other managers or third parties.

The efficiency change documenter 813 may be steps, processes, functionalities, software executable by a processor, or a device including routines to determine changes in efficiency and documenting those changes in efficiency. In some implementations, the efficiency change documenter 813 is coupled to receive the output of the efficiency comparator 809, the operator efficiency determiner 805 and the machine efficiency determiner 803. The efficiency change documenter 813 records and stores the information it receives. The change efficiency documenter 813 can store the information at the data store 243 of the harmonization device 106, or the data store 243 of the server 130. In some implementations, the efficiency change documenter 813 can also produce other information indicating efficiency changes over time. For example, the efficiency change documenter 813 may produce central dashboards to track efficiency across machines 108 and users 102, thereby allowing management to identify and address issues in real-time.

FIG. 9 shows an implementation of a machine instruction code selector 307. In some implementations, the machine instruction code selector 307 includes a device determination module 905 includes a machine determination module 901, a job or part determination module 903, a machine instruction code matcher 905, and a machine instruction code and revision information loader 907. Although not shown in FIG. 9, the machine instruction code selector 307 has access to thousands of machine instruction codes that are stored in a database on the data store 243. These machine instruction codes are operational on a variety of different machines 108. The machine instruction codes are stored in the database with associated revision control information as has been described above. These machine instruction codes represent code or other instructions used to operate a machine 108 in an automated manner. For each machine instruction code, the database includes a number of criteria or fields to track the machine instruction code. Those criteria include but are not limited to the machine 108 for which the machine instruction code is used, the revision number of the machine instruction code, the part associated with the machine instruction code, the job associated with the machine instruction code, a user associated with the machine instruction code, a tool associated with the machine instruction code, etc.

The machine determination module 901 may be steps, processes, functionalities, software executable by a processor, or a device including routines for determining a machine associated with a request for a machine instruction code received by the machine instruction code selector 307. The machine determination module 901 is coupled to the harmonization device 106 to retrieve identification information that identifies the machine 108 associated with the harmonization device 106. For example, the identification information for the machine 108 may be the same identification that is used to identify machine instruction codes in the database that are operational on the machine 108. The machine determination module 901 can query the harmonization device 106 for this information. In some implementations, the harmonization device **106*b* may be associated with a plurality of machines 108*b*, 108*c*. In such an example, the harmonization device 106*b* is able to provide machine identification information for both machines 108*b*, 108*c*. The machine determination module 901 is coupled to the machine instruction code matcher 905** to provide any machine identification information determined in response to a request for machine instruction code.

The job or part determination module 903 may be steps, processes, functionalities, software executable by a processor, or a device including routines to identify a job 110 or part associated with a machine instruction code request received by the machine instruction code selector 307. In one implementation, the job or part determination module 903 receives information from the harmonization device 106 about a job 110 associated with a machine instruction code request. In this case, the harmonization device 106 has detected the RFID tag 112 for a job 110 associated with the machine 108. The job or part determination module 903 determines a part associated with the request for a machine instruction code using the job identifier provided by the RFID tag 112. Then the job or part determination module 903 determines an identification number associated with the part. Once the identification number associated with the part is determined, is output by the job or part determination module 903 to the machine instruction code matcher 905. In another implementation, the identification of the part of a part or the part number is provided to the job or part determination module 903. In this case, the job or part determination module 903 only needs to determine the part identification number associated with the part name that it received. Then the job or part determination module 903 sends the identification number for the part to the machine instruction code matcher 905. In yet another embodiment, the machine instruction code request includes a job 110 and part pair. In this case, the job or part determination module 903 parses job 110 and part pair to determine either a job number or a part number. Once the job or part determination module 903 has either piece of information, it can follow the same processes already described above to retrieve the part identification number. In still other implementations, the request for the machine instruction code includes a part identification number. In such a case, the job or part determination module 903 merely sends the part identification number to the machine instruction code matcher 905.

The machine instruction code matcher 905 may be steps, processes, functionalities, software executable by a processor, or a device including routines to retrieve machine instruction code that are operational on a given machine 108, and that match the machine instruction code request. In particular, the machine instruction code matcher 905 uses the machine number received from the machine determination module 901 and the part number received from the job or part determination module 903 to generate a query and automatically search the database of machine instruction code for any machine instruction code that match those to search terms. In some implementations, the machine instruction code matcher 905 searches and finds only a single machine instruction code. In this case, the machine instruction code matcher 905 sends the matching machine instruction code to the machine instruction code loading module 203 of the harmonization device 106 to be loaded on the machine 108. In other implementations, the machine instruction code matcher 905 performs the search using the machine identification number and the part identification number and the search returns two or more machine instruction codes. In this case, the program matcher 905 may also apply filtering criteria to determine which machine instruction code out of the two or more machine instruction codes to send to the machine instruction code loading module 203 of the harmonization device 106. For example, the machine instruction code manager 905 may filter the two or more machine instruction codes returned based on recency of creation, based on recency of use by the user 102 associated with the machine 108 and the job 110, based on other tag

104, 112, 116 and 120, identification information included in the machine instruction code request, or based on various other criteria or information available from the harmonization device 106 and the tracking, measuring and optimization application 134. As has been noted above, the machine instruction code matcher 905 sends a machine instruction code to the machine instruction code loading module 203 of the harmonization device 1064 loading on its associated machine 108.

The machine instruction code and revision information loader 907 may be steps, processes, functionalities, software executable by a processor, or a device including routines to store changes to the machine instruction code in the database. In one implementation, the machine instruction code and revision information loader 907 is coupled to the machine instruction code change documenter 213 to receive information about modifications that a user 102 has made to the content of machine instruction code during execution of a machine instruction code installed on the machine 108. In another implementation, the machine instruction code and revision information loader 907 is coupled to the machine instruction code manager 301 to receive information about modifications that the user 102 has made to the contents of the machine instruction code during machine instruction code execution. For example, the machine instruction code and revision information loader 907 may receive information about modifications including an original machine instruction code, modified machine instruction code in a change document. The machine instruction code and revision information loader 907 stores the modified machine instruction code in association with the original machine instruction code on the database. The machine instruction code and revision information loader 907 may also send the change document for approval. In some implementations, the machine instruction code and revision information loader 907 only records in the database the original machine instruction code that was sent by the machine instruction code matcher 905 to the harmonization device 106 and relies on the machine instruction code manager 301 to detect changes, notify third parties of changes and record the changes in the database.

FIG. 10 depicts an implementation of a machine instruction code change documenter 213 operational on the harmonization device 106. In some implementations, the machine instruction code change documenter 213 includes an operator change detector 1001, a machine instruction code change comparator 1003, a machine instruction code change requester 1005, and a documentation storer 1007.

The machine instruction change detector 1001 may be steps, processes, functionalities, software executable by a processor, or a device including routines to detect machine instruction code changes made by a user 102 to the contents of machine instruction code operating on machine 108. The machine instruction change detector 1001 is coupled to the machine 108 to determine the machine instruction code that has been executed by the machine 108 and any changes made by the user 102 during execution of the machine instruction code. If the machine instruction change detector 1001 detects any changes during execution of the original machine instruction code by the machine 108, the machine instruction change detector 1001 sends those changes to the machine instruction code change comparator 1003.

The machine instruction code change comparator 1003 may be steps, processes, functionalities, software executable by a processor, or a device including routines to track, record, and compare changes to machine instruction code execution by a user 102 during execution of the original machine instruction code. The machine instruction code change comparator 1003 receives any functional changes made by the user 102 during execution of the original machine instruction code on the machine 108. For every change or modification made by the user 102, the operator changed detector 1001 sends a signal to the machine instruction code change comparator 1003. The machine instruction code change comparator 1003 tracks and temporarily records the modifications made by the user 102 during the execution of the original machine instruction code. The machine instruction code change comparator 1003 uses the detected changes that are tracked and stored to generate a modified version of the original machine instruction code. In some implementations, the machine instruction code change comparator 1003 also generates a change document representing the changes made by the user 102 that were detected during execution of the original machine instruction code. Once the original machine instruction code has completed execution, the machine instruction code change comparator 1003 sends the original machine instruction code, the modified machine instruction code, and the change document to the machine instruction code change requester 1005 and the documentation storer 1007.

The machine instruction code change requester 1005 may be steps, processes, functionalities, software executable by a processor, or a device including routines to notify of changes to the contents of the original machine instruction code and request approval for modified machine instruction code. The machine instruction code change requester 1005 receives the original machine instruction code, the modified machine instruction code, and the change document from the machine instruction code change comparator 1003. The machine instruction code change requester 1005 generates message including the original machine instruction code, the modified machine instruction code and the change document and send a message out for approval. In some implementations, the machine instruction code change requester 1005 sends the message to a formal machine instruction code revision system. In another implementation, the machine instruction code change requester 1005 sends the message to an ERP system. In yet another implementation, the machine instruction code change requester 1005 sends the message to engineering, management, and/or maintenance for the system 100.

The document storer 1007 may be steps, processes, functionalities, software executable by a processor, or a device including routines to store a modified machine instruction code in the machine instruction code database. The document storer 1007 receives the original machine instruction code, the modified machine instruction code, and the change document from the machine instruction code change comparator 1003. The document storer 1007 stores the original machine instruction code, the modified machine instruction code, and the change document in the in the machine instruction code database. In some implementations, the document storer 1007 uses the original document to determine the location for storing the modified document and the change document in the machine instruction code database, and only stores the modified argument to the change document. In another implementation, document storer 1007 stores the original document, the modified document, and the change document in the machine instruction code database but flags the three items as not been approved for reuse.

FIG. 11 shows an implementation of the pairing and association module 311. In some implementations, the pairing and association module 311 includes a historical association retrieval module 1101, a signal strength and ranking determination module 1103, and unassociated tag determination module 1105, an application determination module 1109, a pairing module 1111, and a pairing recording and transmission module 1113. Pairing and association module 311 is operable as part of the tracking, measuring, and optimizing application 134 on the server 130. The pairing and association module 311 performs complementary functions to the tagging identification ranking module 201 on the harmonization device 106. It should be understood that the data store 243 of the server 130 stores a database of tag identification and interaction records.

The historical association retrieval module 1101 may be steps, processes, functionalities, software executable by a processor, or a device including routines for retrieving historical tag information and association information. The historical association retrieval module 1101 accesses the data store 234 to retrieve this information. The historical association information includes tag identification numbers, account numbers, other tags that a given tag has been paired with in the past, a type for the tag, etc. User accounts are initialized in the database by a site administrator with information such as name, username, email, functional group like user, operator, engineer, manager, etc. Users 102 are issued an RFID tag. Each RFID tag has a globally unique identification number, referred to as an EPC, encoded into its internal antenna. Upon first sign-in, the tag is read at the harmonization device 106 but not associated with any user 102 (Sed block 1105 below). The user 102 is prompted to enter his/her username to make the association to the RFID tag. In some implementations, a web portal or client device can be used to enter this information. The user may be prompted to enter other information such as their employee ID number. In some implementations, the user 102 is prompted to request a pairing of the information with their tag. 104. Once the user 102 has made this association with the RFID tag, for future interactions with the RFID tag will now be tied to that particular user. A similar approach association process can be done for tags 112 for jobs 110, tags 116 for tools 114, and tags 124 inventory items 118. This historical association information is retrieved by the historical association retrieval module 1101. The historical association retrieval module 1101 also has access to a database that stores all historical interaction of tags between each other and between them and harmonization devices 106. The historical association retrieval module 1101 can be used to access this information so long as an index, like a tag ID number or other data that is searchable is provided. The historical station retrieval module 1101 is coupled to the database stored in data store 243. In some implementations, tags can be assigned to a group of users. When the tag is detected, the terminal will prompt one of the associated users to log in. This will reoccur for each user 102 that has not yet input their information and tell every user in the group has been associated with the group.

The signal strength and ranking determination module 1103 may be steps, processes, functionalities, software executable by a processor, or a device including routines to interface with the signal strength determiner 401 and the ranking module 403 of the tag identification ranking module 201. In some implementations, signal strength and ranking determination can be made of the server 130 by this signal strength and ranking determination module 1103. It uses the same process as described above with reference to operation of the tag identification and ranking module 201.

The unassociated tag determination module 1105 may be steps, processes, functionalities, software executable by a processor, or a device including routines to identify unassociated tags and initiate processes for association of the tag with a user 102, job 110, tools 114, or inventory item 118. For unassociated tags of users, the process outlined above with reference to the historical association retrieval module 1101 can be followed. For inanimate objects like jobs 110, tools 114 and inventory items 118, the unassociated tag determination module 1105 may initiate routines presented to users 102 or administrators via the harmonization device 106 or the server 130, respectively, to force associations to be made with their respective items. The unassociated tag determination module 1105 is coupled to receive signals from the association retrieval model 407 and signal back whether an association cannot be found in the database.

The application determination module 1109 may be steps, processes, functionalities, software executable by a processor, or a device including routines to determine an application to pair data records with associated with a tag 104, 112, 116, and 120. In some implementations, a tag may be ranked differently depending on the application to which it is paired. The application determination module 1109 is used to access associations and determine whether a given tag is associated with an application that receives higher priority for processing of the tag. The association determination module 1109 is coupled to the historical database association retrieval module 1101 to retrieve received associations of tags with applications.

The pairing module 1111 may be steps, processes, functionalities, software executable by a processor, or a device including routines to pair data records with tags 104, 112, 116, and 120. This process had been described above with reference to the historical association retrieval module 1101. The pairing module 1111 may also access historical pairings that have been made between different tags 104, 112, 116, and 120 and use that information to suggest pairings, assume pairings, or establish pairings between tags. The pairing module 1111 is coupled to provide this information to the peer accordion transmission module 1113.

The pairing recording and transmission module 1113 may be steps, processes, functionalities, software executable by a processor, or a device including routines to update the database of the data storage 243 based on the establishment of new pairings. The pairing recording and transmission module 1113 can store new pairings between a tag and a data record. The pairing recording and transmission module 1113 may also store groupings or pairings between multiple tags 104, 112, 116, and 120. By storing these pairings or groupings, the database can be analyzed to determine correlations between efficiency, inefficiency, productivity, and other issues related to a user 102, a job 110, a tool 114 or an inventory item 118. The pairing recording and transmission module 1113 is coupled to the pairing module 1111 to receive information about tags, pairings, and associations, and is coupled to the database of data storage 243 four storing that information.

FIG. 12 depicts an implementation of a performance enhancement module 313. In some implementations, the performance enhancement module 313 includes a machine monitor 1201, a tag monitor 1203, a user input monitor 1205, a job monitor 1207, and other information collector 1209, and an artificial intelligence (AI) engine 1211, and a recommendation engine 1213. The performance enhancement module 313 is particularly advantageous because it receives a plurality of different data streams and uses those data streams to make decisions regarding operational efficiency. For example, the performance enhancement module 313 receives information about the machines state, proximity of tags to machines, users 102 modifications of operations, efficiency and productivity of job processing, and other information related to job process processing (e.g., availability of inventory items 118) and is able to apply artificial intelligence (AI) and machine learning (ML) to them to generate information that can be used to make recommendations for improvements in efficiency, workflow, and operations.

The machine monitor 1201 may be steps, processes, functionalities, software executable by a processor, or a device including routines to receive and retrieve machine state information. In some implementations, the machine monitor 1201 may be coupled to retrieve machine state information from the machine state monitor 303. The machine monitor 1201 is also coupled to the visual efficiency indicator 207 to receive efficiency information about the machines 108. In other implementations, the machine monitor 1201 is coupled directly to the machine state determiner 205 of the harmonization machine 106. The machine monitor 1201 receives this information and stores it in a database that can be accessed and used by the AI engine 1211.

The tag monitor 1203 may be steps, processes, functionalities, software executable by a processor, or a device including routines to receive and retrieve information regarding tag 104, 112, 116 and 120 presence and usage on the manufacturing facility floor. The tag monitor 1203 is coupled to the tag identification and ranking module 201 or the pairing and association module 311 to receive information about tags 104, 112, 116 and 120 and the spatial relationship between harmonization devices 106 and time duration and given locations. The tag monitor 1203 receives this information and stores it in a database so that it can be used by the AI engine 1211.

The user input monitor 1205 may be steps, processes, functionalities, software executable by a processor, or a device including routines to is coupled to the machine instruction code change documenter 213 and the user interface module 211. The user input monitor 1205 captures information input by the user 102 based on their tag 104. The user input monitor 1205 also captures input that the user 102 provides to machine by the machine instruction code change documenter 213. The user input monitor 1205 stores this information in the database for use by the AI engine 1211.

The job monitor 1207 may be steps, processes, functionalities, software executable by a processor, or a device including routines to collect information about job completion. The job monitor 1207 is coupled to receive information from the time tracking module 215 and the quality tracking module 217. In some implementations the job monitor 1207 receives information about completions of a particular activity out of several activities associated with the job 110. In some implementations, the job monitor 1207 receives data from different machines 108 so that completion of the entire job 110 can be evaluated. The job monitor 1207 also stores the information it collects in the database for use by the AI engine 1211.

The other information collector 1209 may be steps, processes, functionalities, software executable by a processor, or a device including routines to any other information that is produced by any component of any harmonization device 106 or additional information generated by the tracking, measuring, and optimizing application 134. For example, the other information collector 209 may collect information about tolerance parts, data (i.e., the diameter of a hole in a part) of parts coming off the machines 108, environmental conditions change (temp, humidity), machine/tool wear & tear (machine gets less accurate, tools wear out) or material changes (bad batch of raw stock). This particular information can be used by the AI engine 1112 and the recommendation engine 1213 to make immediate notifications to the user's 102 and the managers to take action to rectify the problems and avoid costly losses. The other information collector 1209 may also access other databases in data store 243 maintained by the server 120 for storing other information related to operation of the system 100. Moreover, the other information collector 1219 may also access other data systems including but not limited to customer data stores 138, ERP databases, human resource databases, etc. The other information collector 1209 may copy appropriate portions of these and other data sources for use by the AI engine 1211.

The artificial intelligence (AI) engine 1211 may be steps, processes, functionalities, software executable by a processor, or a device including routines to processing the data from multiple sources to generate signals that can be used by the recommendation engine 1213. The signals generated by the artificial intelligence engine 1211 may include statistical data, specific signals about job performance, productivity, cost reduction, efficiency, revenue increases, process improvements, supply chain changes, scheduling, tolerance of product output, minimization of scrap or waste, machine life, return on investment, analysis of production bottlenecks based on tag 104, 112, 116, and 120 location, and the like. The AI engine 1211 may include one or more machine learning models. The machine learning models may be one or more from the group of k-nearest neighbors and support vector machines, probabilistic systems, evolutionary systems like genetic algorithms, decision trees, neural networks, decision trees, hybrid trees, classifiers, Bayesian inference or networks, random forests, boosting, logistic regression, faceted navigation, query refinement, query expansion, singular value decomposition, linear regression, least squares, and hidden Markov models, and the like. The machine learning models may use supervised learning, semi-supervised learning, or unsupervised learning for building and training the machine learning systems based on the type of data available and the particular machine learning technology used for implementation. The AI engine 1211 is coupled to access the database where the machine monitor 1201, the tag monitor 1203, the user input monitor 1205, the job monitor 1207, and the other information collector 1209 store their information. In some implementations, the AI engine 1211 may receive the information directly from the machine monitor 1201, the tag monitor 1203, the user input monitor 1205, the job monitor 1207, and the other information collector 1209.

The recommendation engine 1213 may be steps, processes, functionalities, software executable by a processor, or a device including routines to generate recommendations for presentation to the user 102 or to administrators. For example, the recommendation engine 1213 may receive the signals from the AI engine 1211 and use them to generate specific recommendations on a user basis and machine basis for the user 102 to perform certain tasks on the manufacturing facility floor that might be identified by the artificial intelligence engine 1211 as historically being performed inefficiently or incorrectly. Additionally, the recommendation engine 1213 may make recommendations on how to improve performance of the work currently being performed as well as recommendations for how to improve the flow of work through the manufacturing facility. In some implementations, the recommendation engine 1213 operates in real-time, and the recommendation engine 1213 presents the recommendations to the user 102 while they are operating machine 108. In some implementations, the recommendation engine 1213 presents the recommendations on the display devices of the machines 108. In other embodiments, the recommendation engine 1213 presents the recommendations on a display device 239 of the harmonization device. In yet another embodiment, the recommendation engine 1213 provides the recommendations to administrators and others accessing the server 130.

Figure 13:
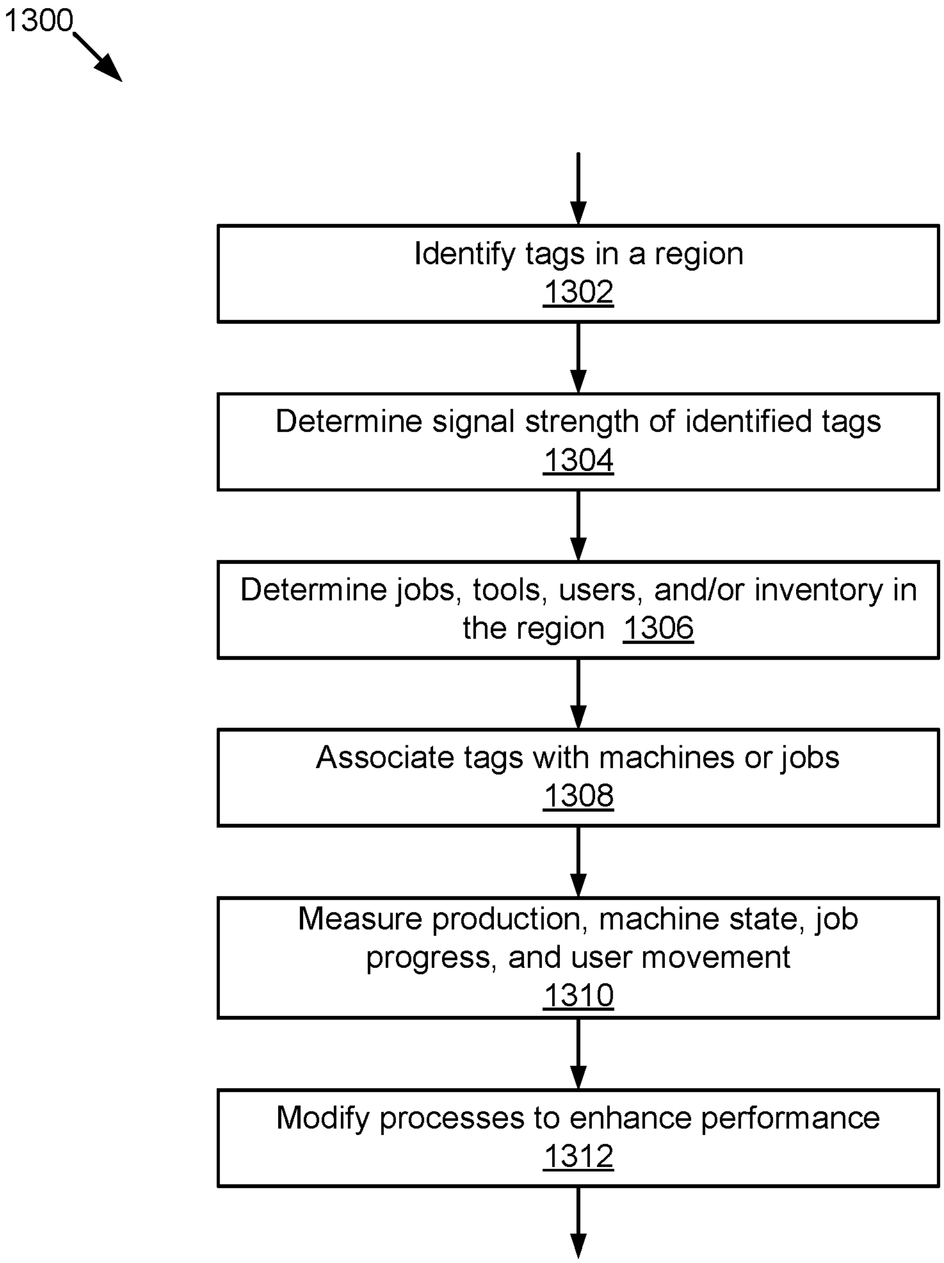
FIG. 13 depicts a flow chart of an implementation of a general method for tracking, measuring & optimizing users, jobs, and machines.

FIG. 13 shows an implementation of a general method 1300 for tracking, measuring & optimizing users, jobs, and machines. In block 1302, the method 1300 identifies tags in a region. For example, as described above, the tags within a reading range of the tag reader 233 of the harmonization device 106 may be identified. Next, the method 1300 determines the signal strength of the tags is determined 1304. Based upon the signal strength and the tag identification numbers, the method 1700 continues to determine 1306 jobs, tools, users, and inventory in the region. Then the method 1700 associates 1308 tags with machines and jobs. The tags are associated with machines purely based on the signal strength of the tag that is near and read by the reader 233. The signal strength can also be used to associate the tags with the highest signal strength with the jobs with the highest signal strength. The method 1700 continues to measure 1310 movement of the tags 104, 112, 116, and 120 across the manufacturing facility floor based upon tag identification and signal strength, and also measures production, machine state, and job progress. Based on the measurement in block 1310, the system 100 can modify 1312 one or more processes to enhance the performance of the overall system.

Figure 14:
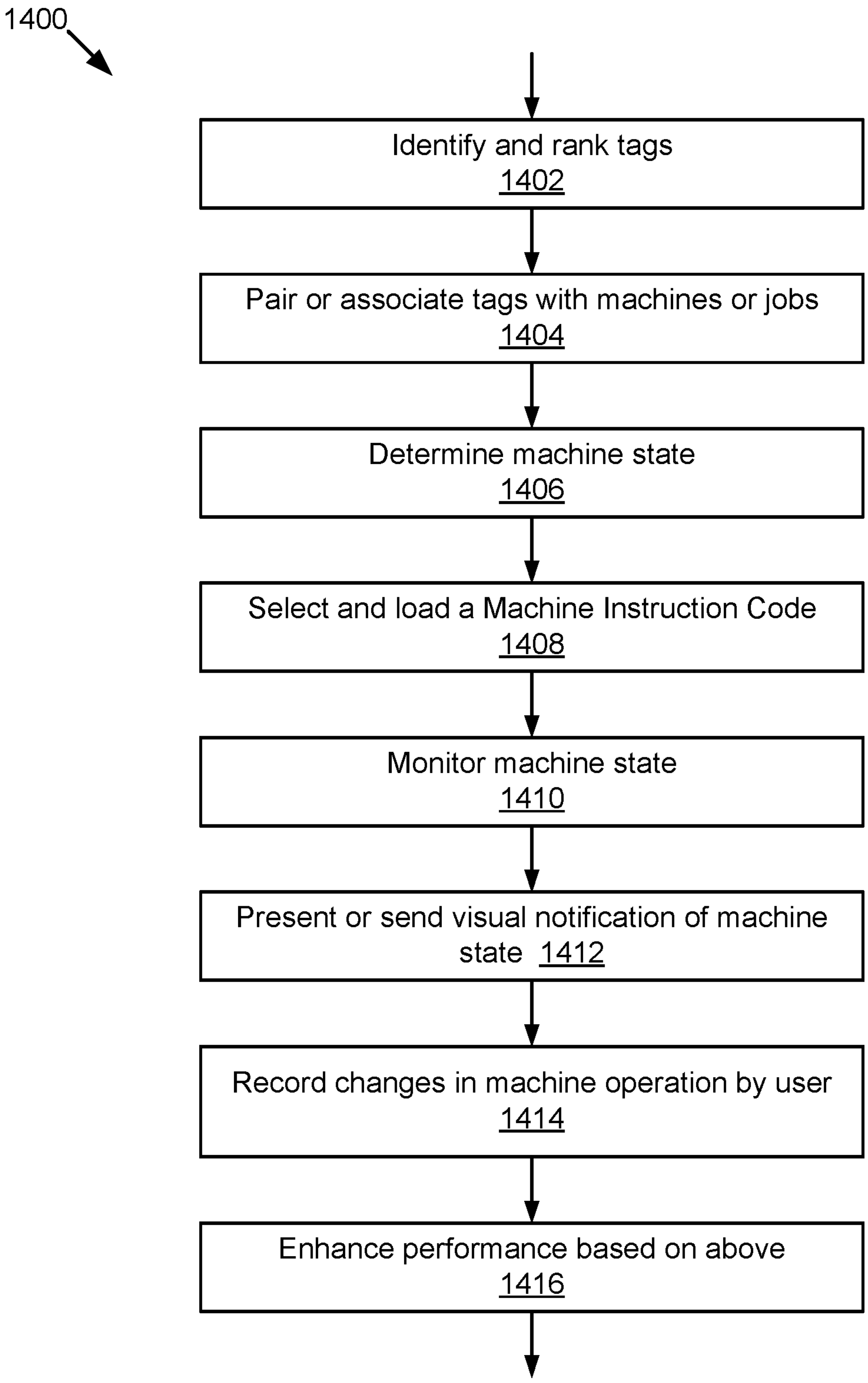
FIG. 14 depicts a flow chart of an implementation of a detailed method for tracking, measuring & optimizing users, jobs, and machines.

FIG. 14 depicts an implementation of a detailed method 1400 for tracking, measuring & optimizing users, jobs, and machines. In block 1402, the method 1400 begins by identifying and ranking 1402 tags. For example, this may be performed by the tag identification ranking module 201. The method proceeds to pair or associate 1404 tags with machines or jobs. For example, the pairing may be done by the pairing and association module 311. Next the method 1400 determines 1406 machine state. The machine state can be determined either by the machine state determiner 205 or the machine state monitor 303. The method 1400 continues to track the state of the machine during times in which it performs different jobs. Next, the method 1700 selects and loads 1408 machine instruction code onto the machine. For example, the machine instruction code selector 307 may determine the machine instruction code, send it to the machine instruction code loading module 203, and the harmonization device 106 loads it on its corresponding machine 108. The method 1400 then monitors 1410 the machine state during the performance of the job. The method 1400 may also send 1412 visual notifications of machine state for display. For example, indications of machine state like efficiency may be displayed on the display device 239 of the harmonization device 106. The method 1400 continues during operation of the job to record 1414 changes in machine operation by the user. The harmonization device 106 records changes that the user makes to the performance of the job to the extent they differ from the machine instruction code selected and loaded in block 1408. In some implementations, the harmonization device 106 tracks the changes that the user made when performing the job and creates a modified machine instruction code based upon them. An example of this process is described below in more detail with reference to FIG. 17. This modified machine instruction code is sent back to the tracking, measuring, and optimizing application 134 and can be used to enhance performance 1416 of the machine 108. An example of this is described in more detail below with reference to FIG. 18.

Figure 15:
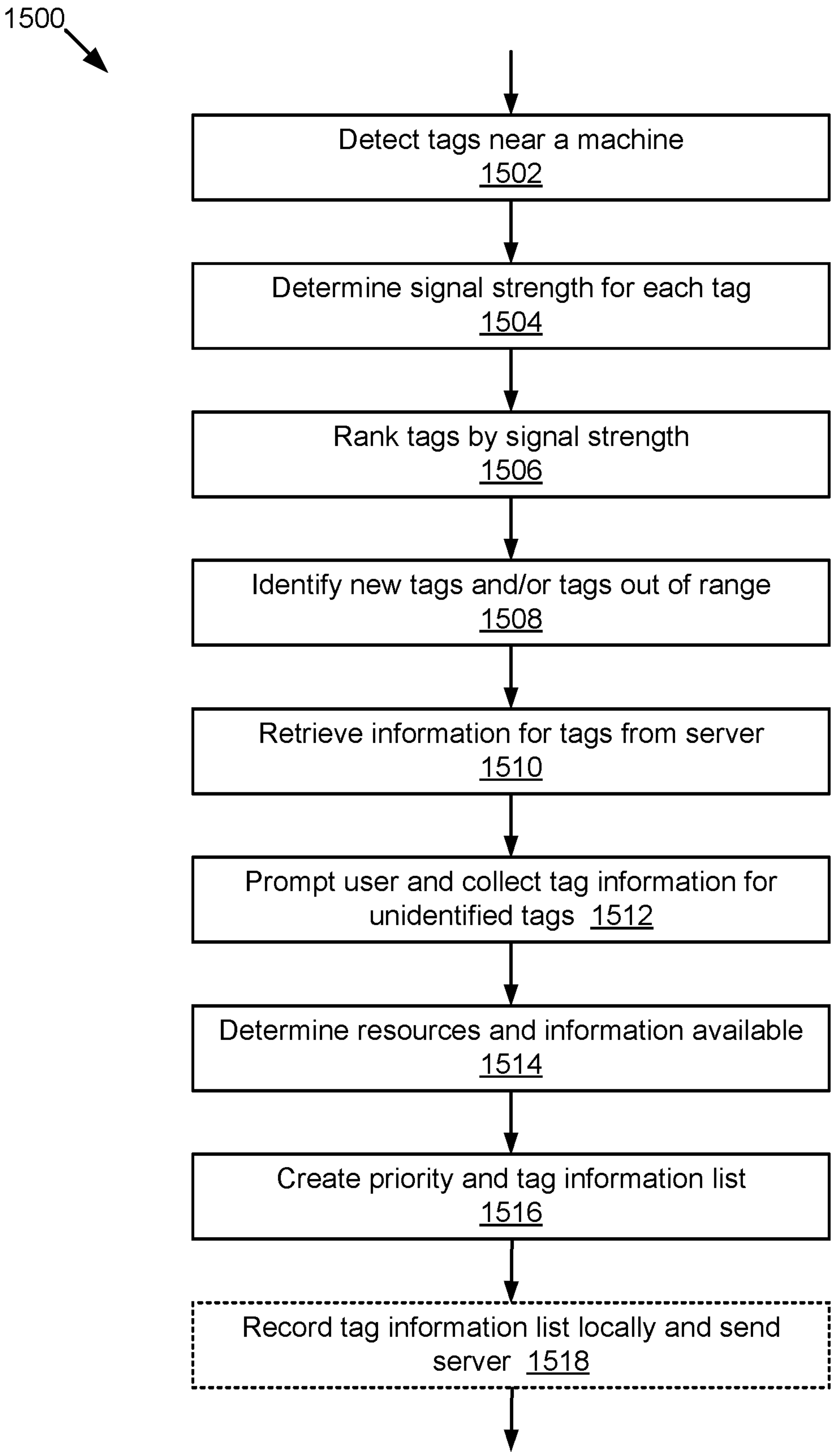
FIG. 15 depicts a flow chart of an implementation of a method for tag identification and ranking.

FIG. 15 shows an implementation of a method 1500 for tag identification and ranking. In block 1502, the method 1500 begins detecting tags in the vicinity of a machine. More specifically, the method 1500 determines the tags that are within an active range of a tag reader 233 associated with machine 108. The method 1500 then determines 1504 a signal strength for each tag. The method 1500 continues by ranking 1506 the tags according to signal strength. Next, the method 1500 identifies 1508 new tags and/or tags out of range. Then the method 1500 retrieves 1510 information for tags from the server 130. The method 1500 determines whether any of the tags are unidentified tags based on the information received from the server 130. The method 1500 then prompts 1512 the user and collects tag information for an unidentified tag. Then the method 1500 determines 1514 resources and information that is available based upon tag signal strength and receive information. Next the method 1500 creates 1516 a priority and tag list. The priority list can be used by other components of the system 100 to determine which tag and associated process to give priority for use of the machine. Finally, the method 1500 may optionally record 1518 the tag information locally and send it to the server 130. The block of recording 1518 is shown in FIG. 15 with dashed lines to indicate that it is optional.

Figure 16:
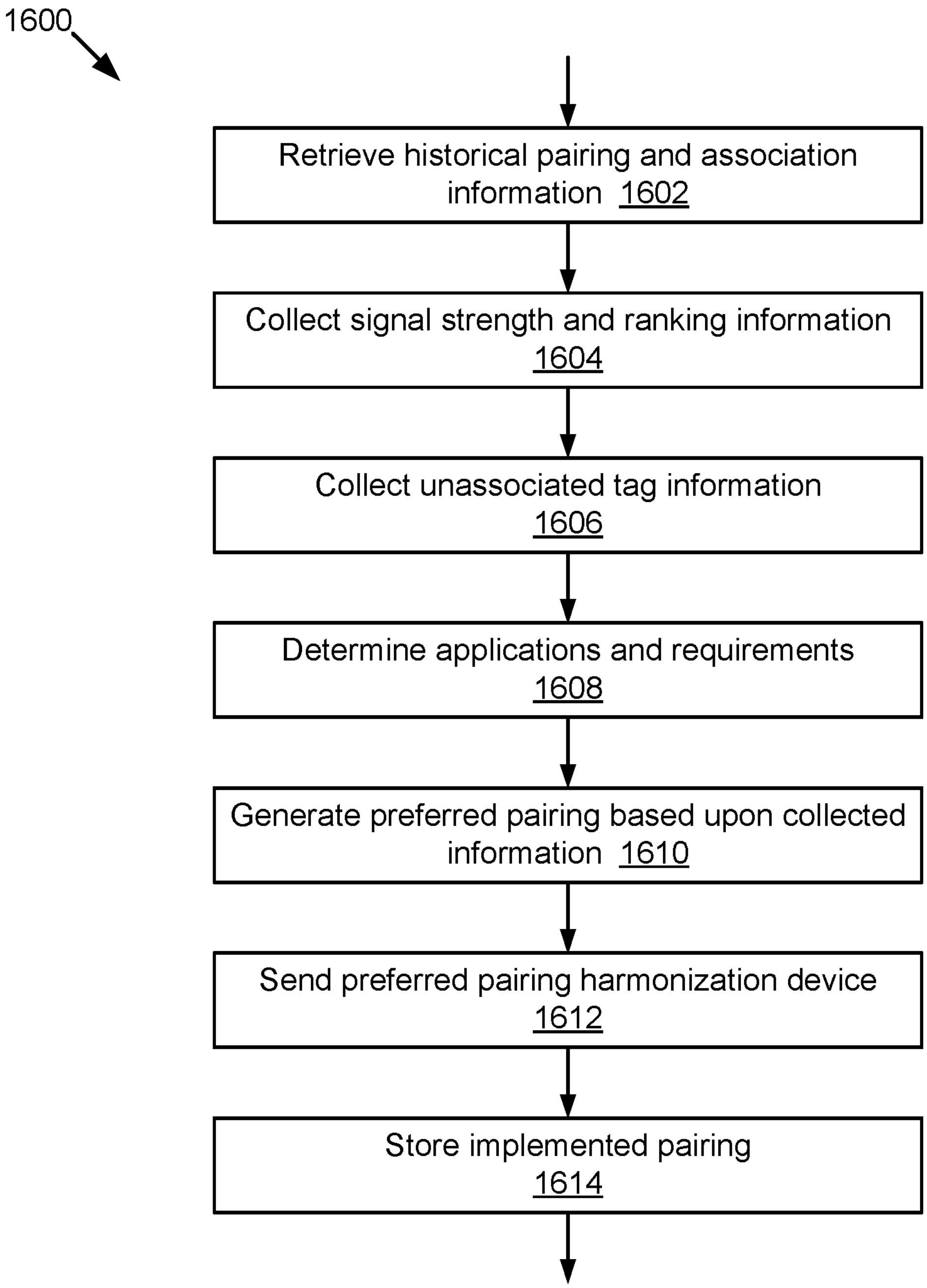
FIG. 16 depicts a flow chart of an implementation of a method for pairing and associating tags.

FIG. 16 depicts an implementation of a method 1600 for pairing and associating tags. In block 1602, the method 1600 retrieves historical pairing and association information. The method 1600 then collects 1604 signal strength and ranking information for tags. The method 1600 continues to collect 1606 unassociated tag information. Next, the method determines 1608 applications and requirements. Based upon the information collected, the method 1600 generates 1610 a preferred pairing. Next the method 1600 sends 1612 the preferred pairing to the harmonization device 106. The harmonization device 106 can implement the preferred pairing. The method 1600 finishes by storing 1614 the implemented pairing.

Figure 17:
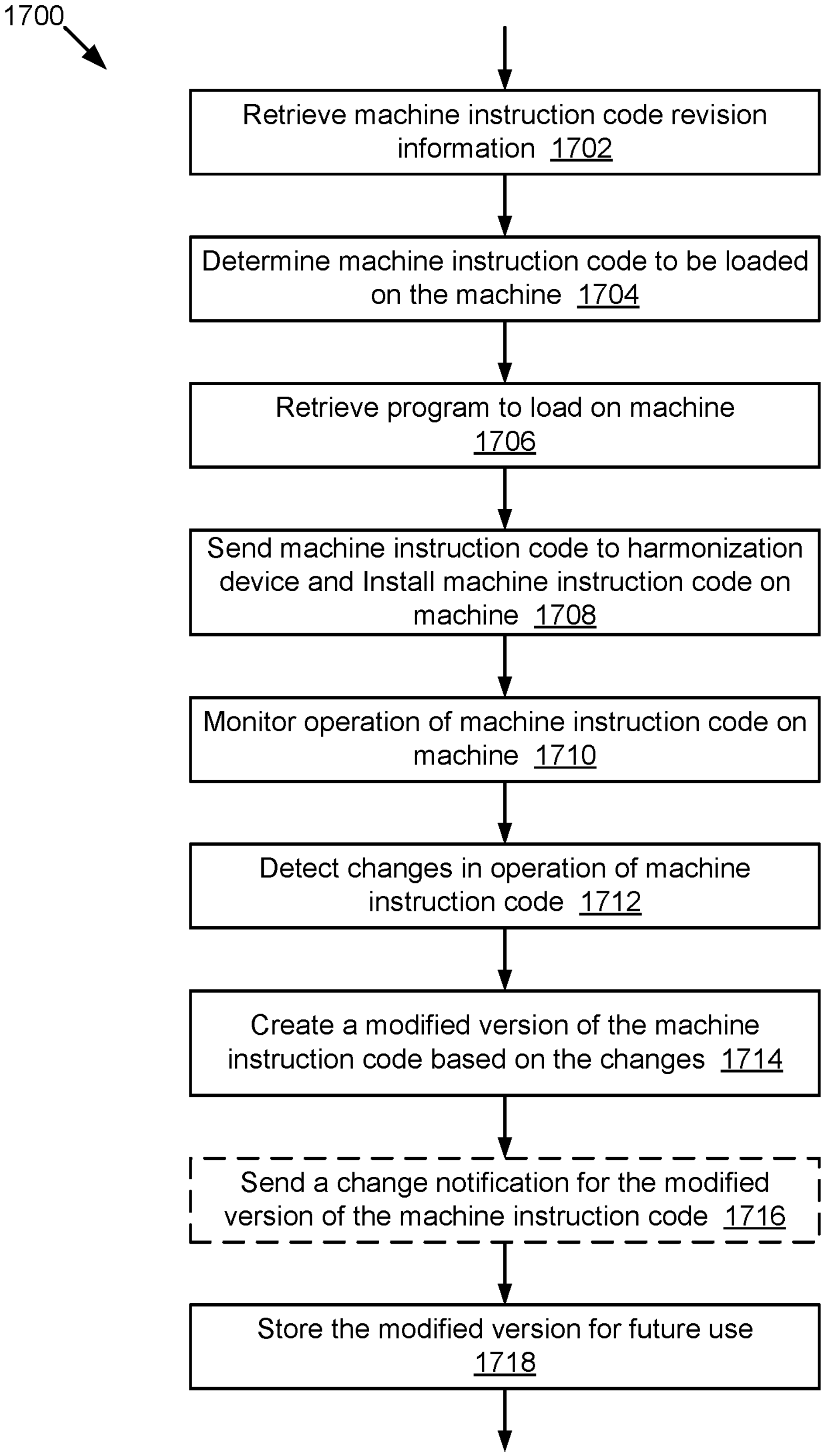
FIG. 17 depicts a flow chart of implementation of a method for determining and sending machine instruction code for operation on a machine.

FIG. 17 shows an implementation of a method 1700 for determining and sending machine instruction code for operation on a machine. In block 1702, the method 1700 retrieves machine instruction code revision information. In this step, the method 1700 accesses a database containing thousands of machine instruction codes and retrieves information about the machine instruction code and their revision history. Next, the method 1700 determines 1704 a machine instruction code version for loading on a given machine 108. The method 1700 makes this determination based on the machine upon which the machine instruction code is going to be loaded and part information. In some implementations, the method 1700 receives a machine identification number and a job identification number. Based on the job identification number, the method 1700 determines the part associated with the job. Then based on the identified machine and the identified part, the method 1700 can determine 1704 the machine instruction code to be loaded on the machine. In some implementations, this determination of the machine instruction code may be based on other factors including user 102, job 110, tool, 114, inventory item 118, and various other factors. The method 1700 proceeds to retrieve 1706 the machine instruction code identified in block 1704 from the database storing the thousands of machine instruction codes. The method 1700 continues and sends 1708 the retrieved machine instruction code to the harmonization device 106 corresponding to the machine 108. The method 1700 also installs this machine instruction code on the machine 108. Next, the method 1700 monitors 1710 the operation of the machine instruction code on the machine. In some implementations, the user 102 may make changes to the machine instruction code as the machine instruction code executes on the machine. As the user 102 operates the machine 108, the user 102 can modify how the machine instruction code operates. The method 1700 detects 1712 changes in the operation of the machine instruction code on the machine 108 during execution. These changes in the operation of the machine instruction code are detected 1712, and the method 1700 creates a modified version of the machine instruction code based on the detected changes. In some implementations, the method 1700 also generates a change document describing the differences between the original machine instruction code and the modified machine instruction code that can be easily understood by the operator or user 102 of the machine and can be displayed on the harmonization device 106 or the server 130. Next, the method 1700 generates and sends 1716 a change notification indicating that a modified version of the machine instruction code has been created. In some implementations, this change notification is sent to a formal change notification system that manages the thousands of machine instruction codes stored in the database, and strictly controls which machine instruction code can be used on machines in the system. This may initiate a process to compare the modified machine instruction code to the original machine instruction code and kick off a workflow with engineering to update the master files after verification and certification of the modified machine instruction code. In some instances, the modified machine instruction code cannot be used until it has been reviewed and approved by a third party such as an engineer or administrator. The method 1700 completes the loop of machine instruction code retrieval, machine instruction code operation, machine instruction code modification, and machine instruction code storage for future use when the method 1700 stores the modified version of the machine instruction code for future use. In some implementations, the method 1700 stores the original version of the machine instruction code, modified version of the machine instruction code and the change document in the database. The store versions of these three items may be flagged as non-usable and tell they have been reviewed by engineering or administration.

Figure 18:
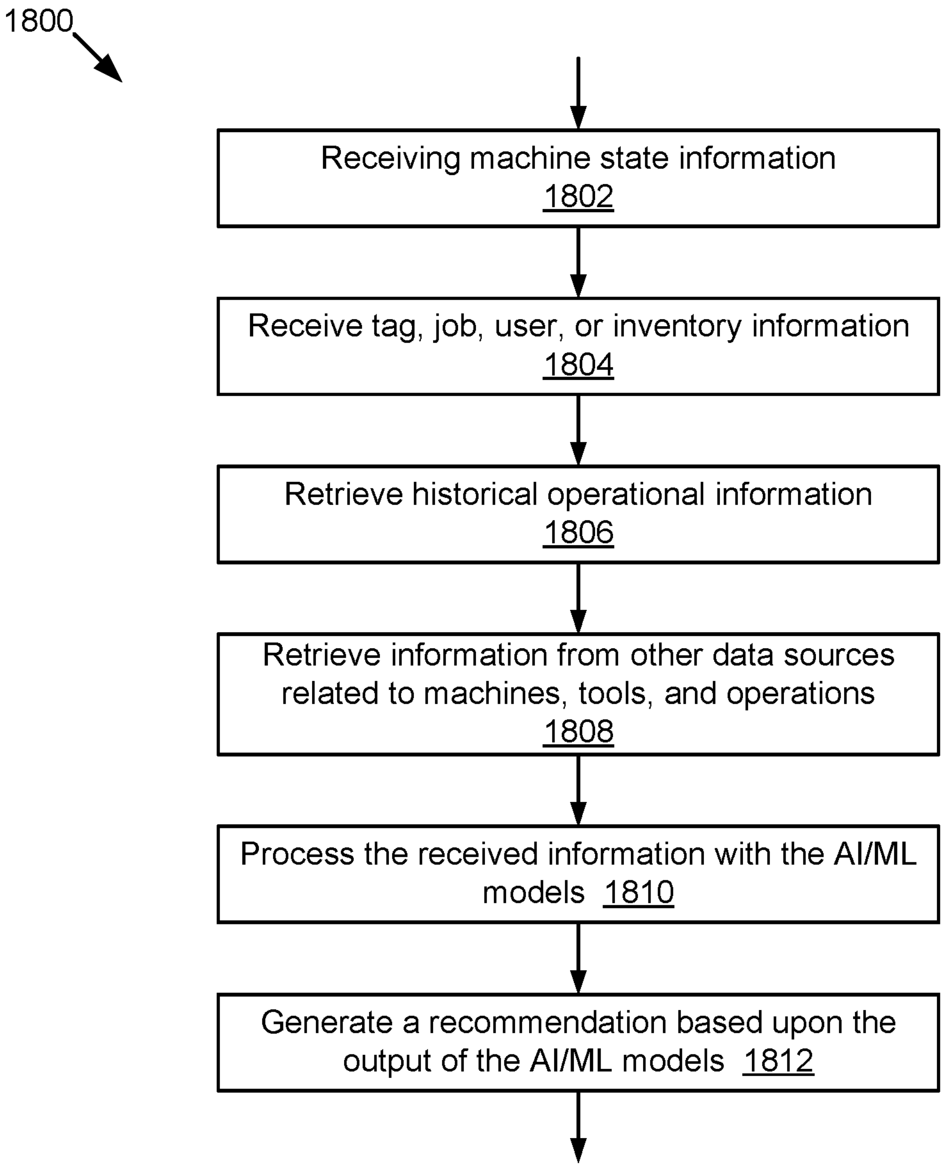
FIG. 18 depicts a flow chart of an implementation of a method for enhancing the operations of machines, jobs, tools, inventory, and users.

FIG. 18 depicts an implementation of a method 1800 for enhancing the performance of machines 108, jobs 110, tools 114, inventory items 118, and users 102. The method 1800 begins in block 1802 by receiving machine state information. In some implementations, the received machine state information may also be stored in a database. The machine state information may be received from the machine state determiner 205 and/or the machine state monitor 303. The method 1800 continues by receiving 1804 tag, jobs, user, or inventory information. In some implementations, the harmonization device 106 associated with each machine 108 sends this information to the server 130 and the server 130 stores it in the database. The method 1800 retrieves 1806 historical operational information. Similarly, the method stores this information in the database. Next, the method 1800 retrieves 1808 information from other data sources related to jobs, machines, tools, operations, or performance. For example, an ERP system of customer, a general database about parts, manufacture information about machines, a human resource database, or a variety of other data sources storing information related to the operation of the manufacturing facility can be accessed and information retrieved. Next, the method 1800 processes 1810 the information received a retrieved in blocks 1802, 1804, 1806 and 1808 with artificial intelligence and/or machine learning models. The machine learning models are applied to the data stored in a database or received to generate signals indicating a variety of ways that the performance of the system can be improved. The signals generated by the AI/ML models are output to a recommendation engine. In block 1812, the method 1800 generates one or more recommendations based on the output of the AI/ML models. In some implementations, the recommendations may be programmatically implemented by the optimization engine 209 or the performance enhancement model 313.

A system and method for automatic and adaptive association, tracking, loading and updating of machine instruction code have been described.

In the above description, for purposes of explanation, numerous specific details are set forth in order to provide a thorough understanding of the techniques introduced above. It will be apparent, however, to one skilled in the art that the techniques can be practiced without these specific details. In other instances, structures and devices are shown in block diagram form in order to avoid obscuring the description and for ease of understanding. For example, the techniques are described in one implementation above primarily with reference to software and particular hardware. However, the present invention applies to any type of computing system that can receive data and commands, and present information as part of any peripheral devices providing services.

Reference in the specification to "one implementation" or "an implementation" means that a particular feature, structure, or characteristic described in connection with the implementation is included in at least one implementation. The appearances of the phrase "in one implementation" in various places in the specification are not necessarily all referring to the same implementation.

Some portions of the detailed descriptions described above are presented in terms of algorithms and symbolic representations of operations on data bits within a computer memory. These algorithmic descriptions and representations are, in some circumstances, used by those skilled in the data processing arts to convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing", "computing", "calculating", "determining", "displaying", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CDROMs, and magnetic disks, read-only memories (ROMs), random access memories (RAMs), EPROMS, EEPROMs, magnetic or optical cards, flash memories including USB keys with non-volatile memory or any type of media suitable for storing electronic instructions, each coupled to a computer system bus.

Some implementations can take the form of an entirely hardware implementation, an entirely software implementation or an implementation containing both hardware and software elements. One implementation is implemented in software, which includes but is not limited to firmware, resident software, microcode, etc.

Furthermore, some implementations can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code can include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the techniques are not described with reference to any particular programming language. It will be appreciated that a variety of programming languages may be used to implement the teachings of the various implementations as described herein.

The foregoing description of the implementations has been presented for the purposes of illustration and description. It is not intended to be exhaustive or to limit the specification to the precise form disclosed. Many modifications and variations are possible in light of the above teaching. It is intended that the scope of the implementations be limited not by this detailed description, but rather by the claims of this application. As will be understood by those familiar with the art, the examples may be embodied in other specific forms without departing from the spirit or essential characteristics thereof. Likewise, the particular naming and division of the modules, routines, features, attributes, methodologies, and other aspects are not mandatory or significant, and the mechanisms that implement the description or its features may have different names, divisions and/or formats. Furthermore, as will be apparent to one of ordinary skill in the relevant art, the modules, routines, features, attributes, methodologies, and other aspects of the specification can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the specification is in no way limited to implementation in any specific programming language, or for any specific operating system or environment. Accordingly, the disclosure is intended to be illustrative, but not limiting, of the scope of the specification, which is set forth in the following claims.

What is claimed is:

1. A computer-implemented method comprising:

determining, by a harmonization device, a plurality of physically detectable tags proximate a machine, each tag being associated with a respective one of the machine, a user, a job, a tool, and an inventory item, the plurality of physically detectable tags being detected by wireless communication with the harmonization device;

for at least one of the plurality of physically detectable tags, determining a tag signal strength indicating a physical proximity of the at least one of the plurality of physically detectable tags to the machine;

based on the tag signal strength, identifying the at least one of the plurality of physically detectable tags as physically present within a proximity of the machine and within a read range of the harmonization device;

determining an original machine instruction code to load on the machine based on the at least one of the plurality of physically detectable tags;

installing the original machine instruction code on to the machine; monitoring operation of the machine while the original machine instruction code executes on the machine, including monitoring one or more of machine condition, a sensor output, machine performance characteristics, and an operational state of the machine;

detecting, based on the monitored operation of the machine, a change in operation of the original machine instruction code on the machine; and automatically creating a modified machine instruction code based on the change in the monitored operation of the original machine instruction code on the machine.

2. The computer-implemented method according to claim 1, wherein determining the machine and the tag associated with the machine comprises:

determining the tag within range of the machine;

determining a part based on the tag; and identifying the original machine instruction code based on the part and the machine.

3. The computer-implemented method according to claim 1, wherein determining the machine and the tag associated with the machine comprises:

determining the tag within range of the machine;

determining the job identified by the tag;

determining a part associated with the job; and identifying the original machine instruction code based on the part and the machine.

4. The computer-implemented method according to claim 3, wherein identifying the original machine instruction code comprises:

searching a database of machine instruction code for a program that matches an identification number of the part;

retrieving a retrieved machine instruction code that matches the identification number of the part; and using the retrieved machine instruction code as the original machine instruction code.

5. The computer-implemented method according to claim 1, further comprising:

storing the modified machine instruction code in a database of machine instruction codes for machines.

6. The computer-implemented method according to claim 1, further comprising:

creating a change document that includes a list of changes between the original machine instruction code and the modified machine instruction code; and storing the change document, the original machine instruction code, and the modified machine instruction code in a database.

7. The computer-implemented method according to claim 6, further comprising generating and sending a change notification including the change document, the original machine instruction code, and the modified machine instruction code to a formal notification system.

8. The computer-implemented method according to claim 1, wherein installing the original machine instruction code on the machine comprises:

copying the original machine instruction code to a memory device;

connecting the memory device to the machine; and transferring the original machine instruction code from the memory device to the machine.

9. The computer-implemented method according to claim 1, wherein installing the original machine instruction code on the machine comprises:

storing the original machine instruction code using an internal memory of the harmonization device; and emulating the original machine instruction code by the harmonization device as a USB device so the machine processes the emulated the original machine instruction code as being loaded to a USB port of the machine.

10. The computer-implemented method according to claim 1 wherein installing the original machine instruction code on the machine, comprises:

retrieving with a server the original machine instruction code from a database sending the original machine instruction code from the server to the harmonization device; and installing the original machine instruction code on the machine using a machine instruction code loading module of the harmonization device.

11. The computer-implemented method according to claim 1, wherein detecting the change in the operation of the original machine instruction code on the machine includes:

determining whether a user has made any changes to the operation of the machine during execution of the original machine instruction code on the machine;

identifying a modification to the original machine instruction code due to changes to the operation of machine by the user; and wherein the automatically creating the modified machine instruction code is done using the identified modification.

12. A system comprising one or more processors and memory operably coupled with the one or more processors, wherein the memory stores instructions that, in response to execution of the instructions by the one or more processors, cause the one or more processors to perform operations including:

determining, by a harmonization device, a plurality of physically detectable tags proximate a machine, each tag being associated with a respective one of the machine, a user, a job, a tool, and an inventory item, the plurality of physically detectable tags being detected by wireless communication with the harmonization device;

for at least one of the plurality of physically detectable tags, determining a tag signal strength indicating a physical proximity of the at least one of the plurality of physically detectable tags to the machine;

based on the tag signal strength, identifying the at least one of the plurality of physically detectable tags as physically present within a proximity of the machine and within a read range of the harmonization device;

determining an original machine instruction code to load on the machine based on the at least one of the plurality of physically detectable tags;

installing the original machine instruction code on the machine; monitoring operation of the machine while the original machine instruction code executes on the machine, including monitoring one or more of machine condition, a sensor output, machine performance characteristic, and an operational state of the machine;

detecting, based on the monitored operation of the machine, a change in operation of the original machine instruction code on the machine; and automatically creating a modified machine instruction code based on the change in the monitored operation of the original machine instruction code on the machine.

13. The system of claim 12, wherein determining the machine and the tag associated with the machine comprises:

determining the tag within range of the machine;

determining a part based on the tag; and identifying the original machine instruction code based on the part and the machine.

14. The system of claim 12, wherein determining the machine and the tag associated with the machine comprises:

determining the tag within range of the machine;

determining the job identified by the tag;

determining a part associated with the job; and identifying the original machine instruction code based on the part and the machine.

15. The system of claim 12, wherein identifying the original machine instruction code comprises:

searching a database of machine instruction codes for a machine instruction code that matches an identification number of a part;

retrieving a retrieved machine instruction code that matches the identification number of the part; and using the retrieved machine instruction code as the original machine instruction code.

16. The system of claim 13, wherein the one or more processors also perform the operations including:

storing the modified machine instruction code in a database of machine instruction codes for machines.

17. The system of claim 13, wherein the one or more processors also perform the operations including:

creating a change document that includes a list of changes between the original machine instruction code and the modified machine instruction code; and storing the change document, the original machine instruction code and the modified machine instruction code in a database.

18. The system of claim 17, wherein the one or more processors also perform the operations including generating and sending a change notification including the change document, the original machine instruction code, and the modified machine instruction code to a formal notification system.

19. The system of claim 13, wherein installing the original machine instruction code on the machine comprises:

copying the original machine instruction code to a memory device;

connecting the memory device to the machine; and transferring the original machine instruction code from the memory device to the machine.

20. The system of claim 13, wherein installing the original machine instruction code on the machine, comprises:

retrieving with a server the original machine instruction code from a database;

sending the original machine instruction code from the server to the harmonization device; and installing the original machine instruction code on the machine using a machine instruction code loading module of the harmonization device.

21. The system of claim 13, wherein detecting the change in the operation of the original machine instruction code on the machine includes:

determining whether a user has made any changes to the operation of the machine during execution of the original machine instruction code on the machine;

identifying a modification to the original machine instruction code due to changes to the operation of machine by the user; and wherein the automatically creating the modified machine instruction code is done using the identified modification.

* * * * *